(12) United States Patent
Narayan et al.

(10) Patent No.: US 10,511,498 B1
(45) Date of Patent: Dec. 17, 2019

(54) MONITORING AND ANALYSIS OF INTERACTIONS BETWEEN NETWORK ENDPOINTS

(71) Applicant: Infoblox Inc., Santa Clara, CA (US)

(72) Inventors: Sandhya Narayan, Saratoga, CA (US); Stuart M. Bailey, San Jose, CA (US)

(73) Assignee: Infoblox Inc., Santa Clara, CA (US)

( * ) Notice: Subject to any disclaimer, the term of this patent is extended or adjusted under 35 U.S.C. 154(b) by 107 days.

(21) Appl. No.: 14/671,457

(22) Filed: Mar. 27, 2015

Related U.S. Application Data

(60) Provisional application No. 62/120,829, filed on Feb. 25, 2015.

(51) Int. Cl.
*H04L 12/26* (2006.01)
*H04L 29/08* (2006.01)
*H04L 29/12* (2006.01)
*H04L 29/06* (2006.01)

(52) U.S. Cl.
CPC .......... *H04L 43/04* (2013.01); *H04L 43/0823* (2013.01); *H04L 43/0876* (2013.01); *H04L 61/1511* (2013.01); *H04L 63/1408* (2013.01); *H04L 63/1441* (2013.01); *H04L 67/02* (2013.01); *H04L 67/10* (2013.01); *H04L 67/306* (2013.01)

(58) Field of Classification Search
CPC ............. H04L 61/1511; H04L 63/1408; H04L 63/1416; H04L 41/046; H04L 41/0896; H04L 29/12066; H04L 12/2869; H04L 43/045
See application file for complete search history.

(56) References Cited

U.S. PATENT DOCUMENTS

| 5,793,976 | A | 8/1998 | Chen et al. | |
| 6,501,754 | B1* | 12/2002 | Ohba | H04L 49/309 370/389 |
| 6,625,648 | B1 | 9/2003 | Schwaller et al. | |
| 6,678,250 | B1 | 1/2004 | Grabelsky et al. | |
| 6,763,380 | B1 | 7/2004 | Mayton et al. | |
| 7,133,402 | B2* | 11/2006 | Nomura | H04L 45/02 370/389 |
| 7,277,931 | B1 | 10/2007 | Booth et al. | |
| 7,480,866 | B2 | 1/2009 | Germain et al. | |

(Continued)

OTHER PUBLICATIONS

Author Unknown, OpenFlow Switch Specification, Version 1.1.0 Implemented (Wire Protocol 0x02), Feb. 28, 2011.

(Continued)

*Primary Examiner* — Barbara B Anyan
(74) *Attorney, Agent, or Firm* — Van Pelt, Yi & James LLP

(57) ABSTRACT

Techniques for monitoring and analysis of interactions between network endpoints are disclosed. In some embodiments, a process for monitoring and analysis of interactions between network endpoints includes collecting Domain Name System (DNS) response data from a network device; determining network endpoint interactions based on an analysis of the DNS response data (e.g., using a processor); and generating a graph corresponding to the network endpoint interactions. For example, the network device can include a DNS device and/or a software-defined networking (SDN) device (e.g., an SDN switch, such as an OpenFlow switch).

24 Claims, 25 Drawing Sheets

(56) References Cited

U.S. PATENT DOCUMENTS

| | | | | |
|---|---|---|---|---|
| 7,739,189 | B1* | 6/2010 | Rosenblatt | G06Q 40/00 235/376 |
| 7,873,046 | B1* | 1/2011 | Seshadri | H04L 63/14 370/229 |
| 8,355,368 | B2* | 1/2013 | Lenzini | H04L 45/22 370/328 |
| 8,868,715 | B2 | 10/2014 | Bearden et al. | |
| 9,208,156 | B2* | 12/2015 | Libal | G06F 17/30 |
| 2003/0012189 | A1* | 1/2003 | Nomura | H04L 45/02 370/389 |
| 2008/0062916 | A1* | 3/2008 | Mosko | H04L 45/18 370/328 |
| 2008/0145050 | A1* | 6/2008 | Mayer | H04J 14/0227 398/49 |
| 2012/0054860 | A1* | 3/2012 | Wyschogrod | H04L 29/12066 726/22 |
| 2012/0158626 | A1* | 6/2012 | Zhu | H04L 63/1408 706/13 |
| 2012/0314575 | A1* | 12/2012 | Frank | H04L 41/0896 370/235 |
| 2014/0258454 | A1* | 9/2014 | Liao | H04L 67/10 709/217 |
| 2014/0310811 | A1* | 10/2014 | Hentunen | H04L 63/1441 726/23 |
| 2014/0317736 | A1* | 10/2014 | Cao | H04L 63/1483 726/23 |
| 2015/0067114 | A1* | 3/2015 | Ruggeri | H04L 61/1511 709/221 |
| 2015/0188783 | A1* | 7/2015 | Shivashankar | G06Q 30/0241 709/224 |
| 2015/0188941 | A1* | 7/2015 | Boshmaf | H04L 67/306 726/22 |
| 2015/0200905 | A1* | 7/2015 | Jandhyala | H04L 51/32 709/206 |
| 2015/0235152 | A1* | 8/2015 | Eldardiry | G06Q 10/0635 705/7.28 |
| 2016/0094477 | A1* | 3/2016 | Bai | H04L 47/786 709/226 |

OTHER PUBLICATIONS

Sherwood et al., OpenFlow, Flow Visor: A Network Virtualization Layer, Oct. 14, 2009.
Das et al., OpenFlow, Unifying Packet and Circuit Switched Networks, Dec. 7, 2009.
Bailey et al., A Network Complexity Index for Networks of Networks, downloaded on Feb. 24, 2015.
Wikipedia, Community Structure, downloaded on Feb. 24, 2015.
Author Unknown, Erlang Programming Language OTP 17.4, downloaded on Feb. 24, 2015.
Author Unknown, Erlang Programming Language, Build Massively Scalable Soft Real-Time Systems, downloaded on Feb. 24, 2015.
Author Unknown, Erlang Programming Language, Documentation, On-Line Documentation, downloaded on Feb. 24, 2015.
Author Unknown, GitHub, FlowForwarding/Tapestry, downloaded on Feb. 24, 2015.
Wikipedia, h-index, downloaded on Feb. 24, 2015.
Author Unknown, Compute Your Network Complexity Index (NCI) with Tapestry, © 2013, downloaded on Feb. 24, 2015.
Author Unknown, ONF, Open Networking Foundation, SDN Architecture Overview, Version 1.1, Nov. 2014.
Author Unknown, Infoblox Announces Tapestry, an Innovative Open-Source Tool for Measuring Network Complexity, Sep. 25, 2013.
Author Unknown, Infoblox, Control Your Network, Whitepaper, How Businesses Can Measure Network Complexity—and Why They Should, © 2013, downloaded on Feb. 24, 2015.
Author Unknown, Loom, Loom Controller, Loom by FlowForwarding, downloaded on Feb. 24, 2015.
Author Unknown, Louvain Method for Community Detection, The Louvain Method for Community Detection in Large Networks, downloaded on Feb. 24, 2015.
Wikipedia, Modularity (networks), downloaded on Feb. 24, 2015.
Nick Mckeown, OpenFlow, (or: "Why Can't I Innovate in my Wiring Closet?", downloaded on Feb. 24, 2015.
Mckeown et al., OpenFlow: Enabling Innovation in Campus Networks, Mar. 14, 2008.
Raghavan et al., Near Linear Time Algorithm to Detect Community Structures in Large-Scale Networks, Sep. 19, 2007.
Sandhya Narayan, Infoblox Inc., Tapestry Architecture, downloaded on Feb. 24, 2015.
Author Unknown, Trusted Computing Group, Expanded IF-MAP 2.0 Addresses a Broader Set of Applications, Sep. 2010.
Author Unknown, ONF, Open Networking Foundation, Software-Defined Networking: The New Norm for Networks, ONF White Papers, Apr. 13, 2012.
Author Unknown, YAWS, Yet Another Webserver, downloaded on Feb. 24, 2015.

* cited by examiner

| Endpoint | Internal | External | Total ▼ | Activity | Outside Connections |
|---|---|---|---|---|---|
| 10.102.3.50 | 248 | 20978 | 21226 | Activity #1 | 18814 |
| 10.102.28.108 | 17 | 5704 | 5721 | Activity #1 | 5479 |
| 10.102.29.187 | 9 | 4712 | 4721 | Activity #1 | 4399 |
| 10.102.29.184 | 19 | 3961 | 3980 | Activity #1 | 3778 |
| 172.23.18.99 | 42 | 3715 | 3757 | Activity #1 | 2963 |
| 172.23.18.168 | 28 | 3655 | 3683 | Activity #1 | 2990 |
| 10.102.29.116 | 10 | 3627 | 3637 | Activity #1 | 3457 |
| 10.102.19.182 | 12 | 3577 | 3589 | Activity #1 | 3420 |
| 172.23.18.171 | 18 | 3424 | 3442 | Activity #1 | 2727 |
| 10.102.16.240 | 20 | 3410 | 3430 | Activity #1 | 3200 |

FIG. 9

Default Settings
% capture all requester ip addresses
    {requester_whitelist,[{"0.0.0.0",0},{"::",0}]},
    {requester_blacklist,[]},
% accept all resolved ip addresses
    {resolved_whitelist,[{"0.0.0.0",0},{"::",0}]},
    {resolved_blacklist,[]},
% query filters (regular expressions)
      {query_whitelist,[""]},
      {query_blacklist,[]},

Settings in deployment
{requester_blacklist,[{"10.102.3.50",32}]}.
{resolved_blacklist,[{"10.102.3.50",32}]}.
{query_blacklist,["^google.com$", "\.google.com$"]}.

MONITORING AND ANALYSIS OF INTERACTIONS BETWEEN NETWORK ENDPOINTS

CROSS REFERENCE TO OTHER APPLICATIONS

This application claims priority to U.S. Provisional Patent Application No. 62/120,829 entitled MONITORING AND ANALYSIS OF INTERACTIONS BETWEEN NETWORK ENDPOINTS filed Feb. 25, 2015, which is incorporated herein by reference for all purposes.

BACKGROUND OF THE INVENTION

A computer network or data network generally refers to a telecommunications network that enables computing devices to exchange data. In computer networks, various types of network computing devices can communicate data with each other using various data/network connections, which are generally referred to as network links (e.g., data links, connections, or flows). Network links can include communications over one or more networks (e.g., private/enterprise networks, private/home networks, and/or the Internet). Data is generally transferred over network links in the form of data packets using various network protocols (e.g., TCP/IP and/or other network/communication protocols, including higher and lower level protocols in reference to the OSI network stack). The data/network connections between various computing devices (e.g., nodes in the network) can be implemented using wired-based network connections (e.g., over physical wires, such as cable media) and/or wireless-based network connections (e.g., over wireless media).

Various types of network monitoring tools exist for monitoring computer networks. For example, various network management tools exist to notify a network administrator if a network component is slow or failing to operate properly. As another example, network tomography tools exist to perform various network measurements, such as to monitor the health of network connectivity using various end-to-end probes sent by agents located at different points in a network and/or the Internet. As yet another example, route analytics tools exist to monitor routes and identify routing issues that impact network performance. Network security tools also exist to monitor various network security related issues, such as intrusion detection and firewall tools.

BRIEF DESCRIPTION OF THE DRAWINGS

Various embodiments of the invention are disclosed in the following detailed description and the accompanying drawings.

FIG. 9 is a diagram that shows a table of endpoint interactions in accordance with some embodiments.

FIG. 19 provides example filtering settings for processing the collected DNS responses in accordance with some embodiments.

DETAILED DESCRIPTION

Figure 1:
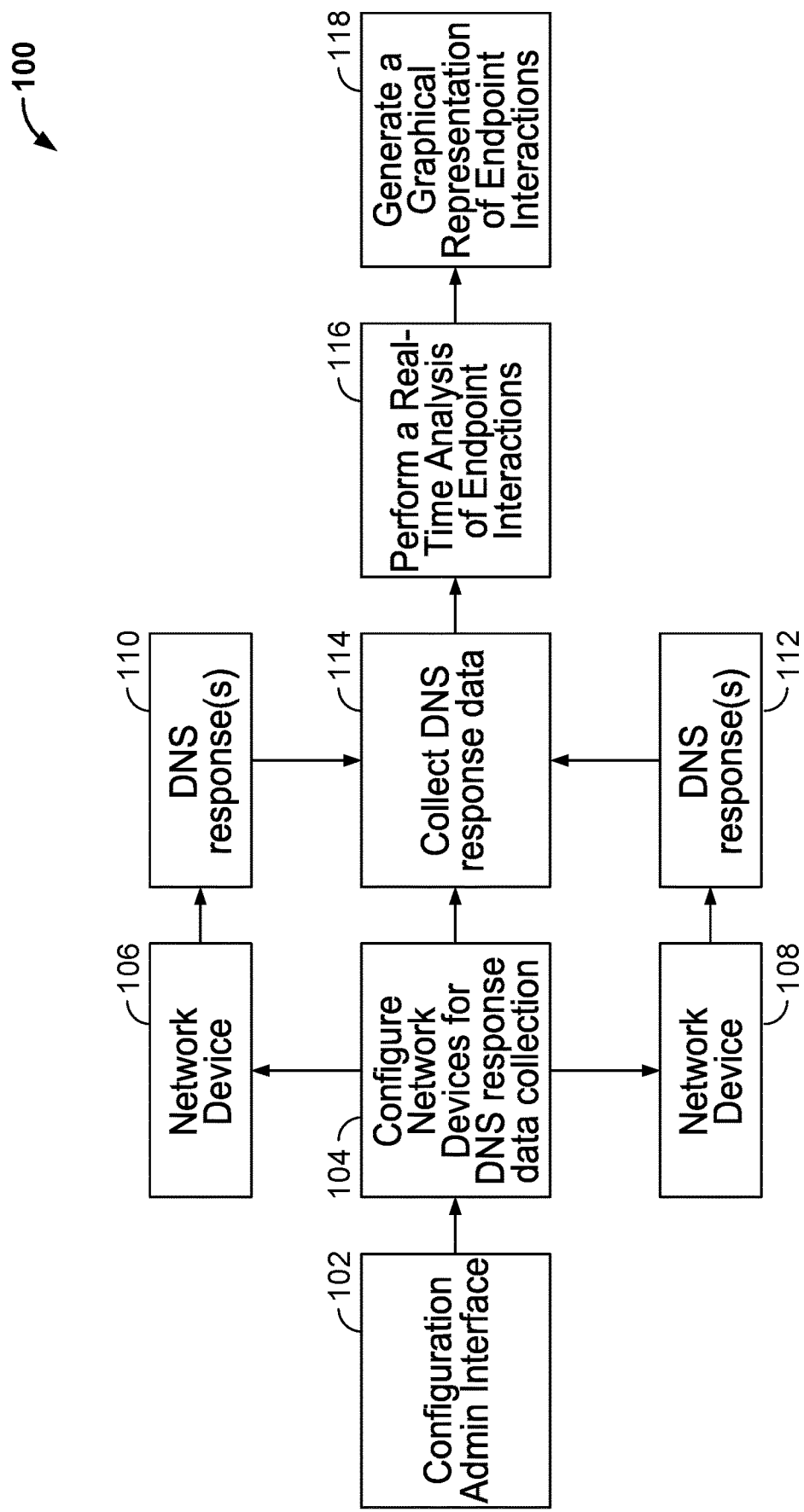
FIG. 1 is an activity diagram of a system for monitoring and analysis of interactions between network endpoints in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A computer network or data network generally refers to a telecommunications network that enables computing devices to exchange data. In computer networks, various types of network computing devices (e.g., computing devices capable of network communications) can communicate data with each other using various data/network connections, which are generally referred to as network links (e.g., data links, connections, or flows). Network links can include communications over one or more networks (e.g., private/enterprise networks, private/home networks, and/or the Internet). Data is generally transferred over network links in the form of data packets (e.g., network packets) using various network protocols (e.g., TCP/IP and/or other network/communication protocols, including higher and lower level protocols in reference to the OSI network stack). The data/network connections (e.g., generally referred to herein as network connections) between various computing devices (e.g., nodes in the network) can be implemented using wired-based network connections (e.g., over physical wires, such as cable media) and/or wireless-based network connections (e.g., over wireless media).

Various types of network monitoring tools exist for monitoring computer networks. For example, various network management tools exist to notify a network administrator if a network component is slow or failing to operate properly. As another example, network tomography tools exist to perform various network measurements, such as to monitor the health of network connectivity using various end-to-end probes sent by agents located at different points in a network and/or the Internet. As yet another example, route analytics tools exist to monitor routes and identify routing issues that impact network performance. Network security tools also exist to monitor various network security related issues, such as intrusion detection and firewall tools.

With the growth of bring your own devices (BYOD) to enterprises (e.g., employees often bring their own mobile devices, such as smart phones, smart watches, tablets, laptops, and/or other computing devices to use at the office and/or to use while working from home), mobile devices and specialized external services used by enterprises and employees of such enterprises, the corporate/enterprise network and its partner extensions have become increasingly important Information Technology (IT) assets and communication infrastructures of enterprises. As such, understanding and advocating requirements and issues of the corporate/ enterprise network is an important task for the enterprise (e.g., usually a responsibility of a Chief Information Officer (CIO) and/or the IT organization of the enterprise).

However, network complexity, and not just network bandwidth, is increasingly becoming a barrier to network growth. Traditional approaches to network planning typically focus on network bandwidth, network infrastructure devices, and the network interconnections (e.g., interconnecting/configuring wired-based and/or wireless-based networks). But such traditional approaches generally fail to provide insights into network complexity. In particular, such traditional approaches generally fail to provide tools for monitoring connections between network endpoints.

Thus, what are needed are new and improved tools for monitoring network connections between network endpoints.

Overview of Techniques for Monitoring and Analysis of Interactions Between Network Endpoints Accordingly, techniques for monitoring and analysis of interactions between network endpoints are disclosed.

In some embodiments, a system/process/computer program product for monitoring and analysis of interactions between network endpoints includes collecting Domain Name System (DNS) response data from a network device; determining network endpoint interactions based on an analysis of the DNS response data (e.g., using a processor); and generating a graph corresponding to the network endpoint interactions. For example, the network device can include a DNS device and/or a software-defined networking (SDN) device (e.g., an SDN switch, such as an OpenFlow switch).

In one embodiment, a system/process/computer program product for monitoring and analysis of interactions between network endpoints further includes storing the DNS response data in a data store.

In one embodiment, a system/process/computer program product for monitoring and analysis of interactions between network endpoints further includes executing a telemetry platform (e.g., using a processor), wherein the telemetry platform includes a controller for collecting the DNS response data from a network device (e.g., an SDN device, such as an OpenFlow switch).

In one embodiment, a system/process/computer program product for monitoring and analysis of interactions between network endpoints further includes configuring a software-defined networking (SDN) device to send DNS response data to a controller of a telemetry platform (e.g., using the controller of the telemetry platform).

In one embodiment, a system/process/computer program product for monitoring and analysis of interactions between network endpoints further includes generating a report based on an analysis of the network endpoint interactions for a plurality of network endpoints internal to an enterprise network (e.g., internal endpoints).

In some embodiments, a system for monitoring and analysis of interactions between network endpoints includes a controller for collecting network data from a plurality of network devices in an enterprise network; a data store in communication with the controller for storing the network data; an analyzer in communication with the data store for performing an analysis of the network data to determine interactions between network endpoints; and a graphics visualizer in communication with the analyzer for generating a graph based on the interactions between network endpoints. For example, the plurality of network devices can include physical network devices, virtual network devices, and/or software-defined networking (SDN) devices, and the network data can include Domain Name System (DNS) responses.

In one embodiment, a system for monitoring and analysis of interactions between network endpoints further includes a data aggregator in communication with the controller for aggregating the network data.

In one embodiment, a system for monitoring and analysis of interactions between network endpoints further includes a web server in communication with the analyzer for web-based network communications with the system.

For example, the disclosed techniques for monitoring and analysis of interactions between network endpoints can provide insights to facilitate network infrastructure planning (e.g., network capacity planning, etc.), such as further described below.

As another example, the disclosed techniques for monitoring and analysis of interactions between network endpoints can be applied to identify and/or resolve various network/computer security issues (e.g., to identify network endpoints that were in communication with an infected network endpoint and/or a known malware uniform resource locator (URL) destination, etc.), such as further described below.

As yet another example, the disclosed techniques for monitoring and analysis of interactions between network endpoints can be applied to identify and/or resolve various other network related issues (e.g., to provide insights into network complexity, network performance, etc.), such as further described below.

In one embodiment, a system/process/computer program product for monitoring and analysis of interactions between network endpoints includes a search function (e.g., various search capabilities to search the monitored and filtered/analyzed network endpoint interactions data). For example, a network application (e.g., NCI/tapestry application and/or other application, such as described herein) can implement enhanced search capabilities (e.g., to facilitate searches that can be performed across many criteria such as endpoint IP addresses and net masks, fully qualified domain names (FQDNs) or parts/subsets of domain names, activities, time-range(s) when the endpoint interaction was monitored/observed, and/or other criteria). In some cases, such search capabilities can help in identifying causes for observed anomalies in activity or endpoint graphs, such as further described below. In some cases, such search capabilities can help in identifying trends for network capacity planning based on the endpoint interactions data, such as further described below.

In one embodiment, a system/process/computer program product for monitoring and analysis of interactions between network endpoints includes comparing interactions of two or more endpoints to identify similarities. For example, this feature can be used to facilitate identification of malware-controlled systems, such as further described herein.

In one embodiment, a system/process/computer program product for monitoring and analysis of interactions between network endpoints includes performing multiple analytics based on different criteria concurrently. For example, this feature can be used to help to identify and narrow down the scope of search for endpoints of interest such as malware-infected endpoints, such as further described herein.

In one embodiment, a system/process/computer program product for monitoring and analysis of interactions between network endpoints includes adding external metadata to internal and/or external endpoints (e.g., such metadata can be different for different endpoints) to improve analytics of endpoint interactions, such as described herein. For example, MAC addresses, host names, and/or FQDNs provided from external sources can be added to graph vertex labels for storing in the graph of endpoint interactions, such as further described below. As a result, certain endpoints can be selectively tracked differently from others based on such metadata. In some cases, these endpoints may be serving important functions in the network or may be suspicious endpoints (e.g., IT/network admin expert/other input can identify critical endpoints in an enterprise network, such as a payroll server, a source code repository, or other expert metadata/tags associated with particular endpoints in the graph that can facilitate greater insights into monitored network endpoint interactions for various purposes), such as further described herein.

In one embodiment, a system/process/computer program product for monitoring and analysis of interactions between network endpoints includes adaptive expertise learning capabilities to capture and enhance endpoint and interaction information. For example, IT/network admin personnel generally have deep knowledge of their network deployment, often undocumented or in a form not available to be input into endpoint metadata. The disclosed techniques can capture information directly from such users, in some cases, by prompting power users to fill-in information about some auto-detectable graph structures. In some cases, identifying an endpoint(s) with high in-degree or high out-degree can be of interest (e.g., users can even leave questions for others to answer about an endpoint or interaction set).

In one embodiment, a system/process/computer program product for monitoring and analysis of interactions between network endpoints includes enhanced visualization and navigation of graphs (e.g., including large graphs). For example, in dealing with large graphs, improved visualization and navigation facilitates a better understanding of the underlying network data represented by such large graphs, such as further described below. In an example implementation, various domain level heuristics can be implemented to partition a graph in addition to the automatic partitioning done by community detection, such as further described below.

In one embodiment, a system/process/computer program product for monitoring and analysis of interactions between network endpoints includes a capability to scale to large graphs. For example, the disclosed NCI/Tapestry application can be applied to any endpoint interactions (e.g., any graph structure, such as Facebook friends or Twitter followers). As such, the capability to scale to billions of edges and endpoints can be useful for various applications.

In one embodiment, a system/process/computer program product for monitoring and analysis of interactions between network endpoints includes support of time series data, such as counts, which can be associated with endpoint interactions. For example, such time series data can improve community detection as well as add a time dimension to the endpoint interaction visibility, such as further described below.

In one embodiment, a system/process/computer program product for monitoring and analysis of interactions between network endpoints includes support for real-time updates to the graph visualization. For example, real-time updates to the graph visualization of network endpoint interactions can facilitate various security use case scenarios, such as further described below.

In one embodiment, a system/process/computer program product for monitoring and analysis of interactions between network endpoints includes support for an ability to track community participation and fan-out of endpoints over time. For example, each endpoint's interaction history can be part of its profile and can be maintained in the graph visualization of network endpoint interactions. As such, an anomaly can be indicated when an endpoint exhibits behavior that is different from its profile, such as further described below.

In one embodiment, a system/process/computer program product for monitoring and analysis of interactions between network endpoints includes a telemetry platform (e.g., a telemetry and analytics platform) that includes one or more of the following features: a distributed architecture for each component for scalability and performance; support for different data collection methods and utilities (e.g., data can be collected from DNS/other logs and/or span ports); access tracking and control (e.g., to support different categories of users, different access rights can be provided; as an example, not all users may not be permitted to view all the FQDNs); support input filtering (e.g., such data is collected from known/trusted sources only); and a scalable rendering engine provided for rendering graphs (e.g., large graphs) executed on a server that is navigable from a client device.

In one embodiment, a system/process/computer program product for monitoring and analysis of interactions between network endpoints includes partitioning a graph visualization of network endpoint interactions in different ways (e.g., which can be executed as separate instances that can be executed in parallel). For example, a graph visualization of network endpoint interactions can be partitioned based on internal/intranet and external activities; browsing versus ad networks; engineering group versus finance group within an enterprise; and/or based on other criteria/metadata.

In an example implementation, techniques for monitoring and analysis of interactions between network endpoints can be delivered by a third-party outsource/service provider as a cloud service and/or implemented internally in an enterprise network for providing various insights into the network complexity, network performance, network infrastructure planning, network security, and/or other network related issues, such as described herein.

As further described below, these and various other features and techniques are disclosed for monitoring and analysis of interactions between network endpoints to enhance network analysis and monitoring, such as an enterprise network.

Introduction to Measuring Network Complexity

Various techniques are disclosed for monitoring and analysis of interactions between network endpoints to measure network complexity. For example, Tapestry is an open source tool provided by Infoblox Inc. that offers a solution for measuring network complexity based on monitored interactions between network endpoints (e.g., also referred to herein as an NCI application). In particular, Tapestry is a network application (e.g., an application executed on a networked computing device, such as a laptop computer, desktop computer, a server, or other computing device) that collects data related to endpoint interactions from network-wide control systems for an enterprise network, such as DNS devices (e.g., DNS appliances/servers). In an example implementation, Tapestry is an application that provides visibility into endpoint interactions and is built on an integrated platform for network telemetry and analytics (e.g., an integrated platform for network telemetry and analytics, which is also referred to herein as a telemetry platform), such as further described below. Tapestry then analyzes the collected data related to endpoint interactions and computes a measure or indicator for the network complexity for the enterprise network, which is referred to herein as the Network Complexity Index (NCI). The measured NCI provides insights (e.g., a new level of visibility) into the complexity of the network (e.g., for the enterprise network in this example).

For example, Tapestry is a tool that focuses on network complexity, identifying relationships of business processes to an increasingly large, dynamic, and shared global IT infrastructure, and arrives at, for example, a single number referred to as the Network Complexity Index (NCI), such as described further below. By monitoring NCI over time, network operators (e.g., network/IT administrators (admins)) can be given insights into and better understand changes in the complexity of their network. In some cases, such network complexity insights can be utilized by network operators to perform network capacity planning (e.g., to better allocate and plan for network resources).

In an example implementation, a network application, such as Tapestry or another tool for monitoring and analyzing interactions between endpoints, can collect data related to endpoint interactions from network-wide control systems for an enterprise network, such as DNS devices (e.g., DNS appliances/servers). Generally, whether an endpoint that is in communication with an enterprise network is a BYOD device or a company-owned/provided device, when that endpoint uses internal or external resources and applications, that endpoint first typically makes a DNS request for domain name resolution for the service or resource of interest (e.g., assuming that the device is using web-based network communications to request a domain via a uniform resource indicator (URI) or, also referred to herein as, a uniform resource locator (URL)). By tracking the use of DNS by endpoints, interactions between endpoints can be identified and monitored (e.g., regardless of what application caused/initiated the interaction). For example, this endpoint interaction data can show how an enterprise network is being used and quantify how complex it is, regardless of where the endpoints, applications, and services of that enterprise reside.

Unlike existing approaches that typically just focus on endpoint visibility, the various techniques for monitoring and analysis of interactions between network endpoints disclosed herein can provide a new and improved macro view by, for example, providing visibility into endpoint interactions, showing which endpoints are interacting with each other, and/or various other aspects related to endpoint interactions as further described herein. The insights into such endpoint interactions for an enterprise network can be implemented to facilitate management of enterprise networks for network operations, such as further described below with respect to various embodiments and example use case scenarios.

Overview of a System for Monitoring and Analyzing Interactions Between Network Endpoints FIG. 1 is an activity diagram of a system for monitoring and analysis of interactions between network endpoints in accordance with some embodiments. In one embodiment, a network application for monitoring and analyzing interactions between endpoints collects data related to endpoint interactions from network-wide control systems for an enterprise network, such as DNS devices (e.g., DNS appliances/servers) and/or other network devices. The network application analyzes endpoint interaction data (e.g., (near) real-time endpoint interaction data) to identify and record higher-level relationships between endpoints. The network application generates a graphical representation of the endpoint interactions, such as shown in FIG. 1 as further discussed below.

In one embodiment, the network application (e.g., Tapestry or another application/tool, which can be, for example, integrated with a platform on which such applications can execute, such as similarly described herein) includes a graphical user interface (GUI) to represent the monitored and analyzed endpoint interactions. For example, the GUI of the network application can provide new insights to a network operator/admin by combining individual endpoint information together with a classification(s) of endpoints into groups or communities based on the nature of interactivity between endpoints. As such, the network application is a tool for a network operator/admin that provides new and improved techniques to identify complexity of interacting business processes and the underlying network that supports such processes. For instance, observing endpoint interaction behavior of related endpoints rather than just an endpoint's behavior alone can provide users (e.g., a network operator/admin) with a quick broad view of related activities and/or anomalous activities in the network, such as further described below.

Referring to FIG. 1, an activity diagram 100 of a system for monitoring and analysis of interactions between network endpoints initiates with a network/IT admin for a network (e.g., an enterprise network) using a configuration admin interface of the network application at 102 to perform a configuration of network devices in the network (e.g., the enterprise network) at 104. For example, the configuration can include identifying and/or configuring network devices in the network (e.g., the enterprise network) from which to collect DNS response data (e.g., to receive DNS response log data from such DNS devices, so that the desired DNS response log data can be pushed or pulled for such collection, and/or tapping network/DNS data from SDN/virtual network devices such as OpenFlow switches, such as further described herein). The network devices at 106 and 108 provide DNS response data at 110 and 112 to DNS queries for interactions requested by endpoints in the network (e.g., the enterprise network). The network application collects DNS response data at 114. For example, the collected DNS response data can include a tuple of the IP address of the requesting endpoint, the IP address of the destination endpoint, and the fully qualified domain name (FQDN) of the destination endpoint. In some cases, other information can also be collected with such DNS responses, such as timestamp data and/or other data as further described below. The network application performs a real-time analysis of endpoint interactions at 116. In an example implementation, positive DNS responses can serve as a basic and reliable indicator for interactions between endpoints (e.g., in most networks, DNS responses are indicative of a significant portion of interactions between endpoints, such as sessions or other connections that indicate interactions between endpoints). The network application generates a graphical representation (e.g., a graphical visualization) of endpoint interactions at 118. For example, various graphs, charts, tables, reports, and/or alerts that illustrate and/or summarize the analyzed endpoint interactions can be generated, such as further described below. In another example implementation, the network application can be developed to perform a particular application, in which the network application executes on a system platform for monitoring and analysis of interactions between network endpoints, such as further described below.

Figure 2:
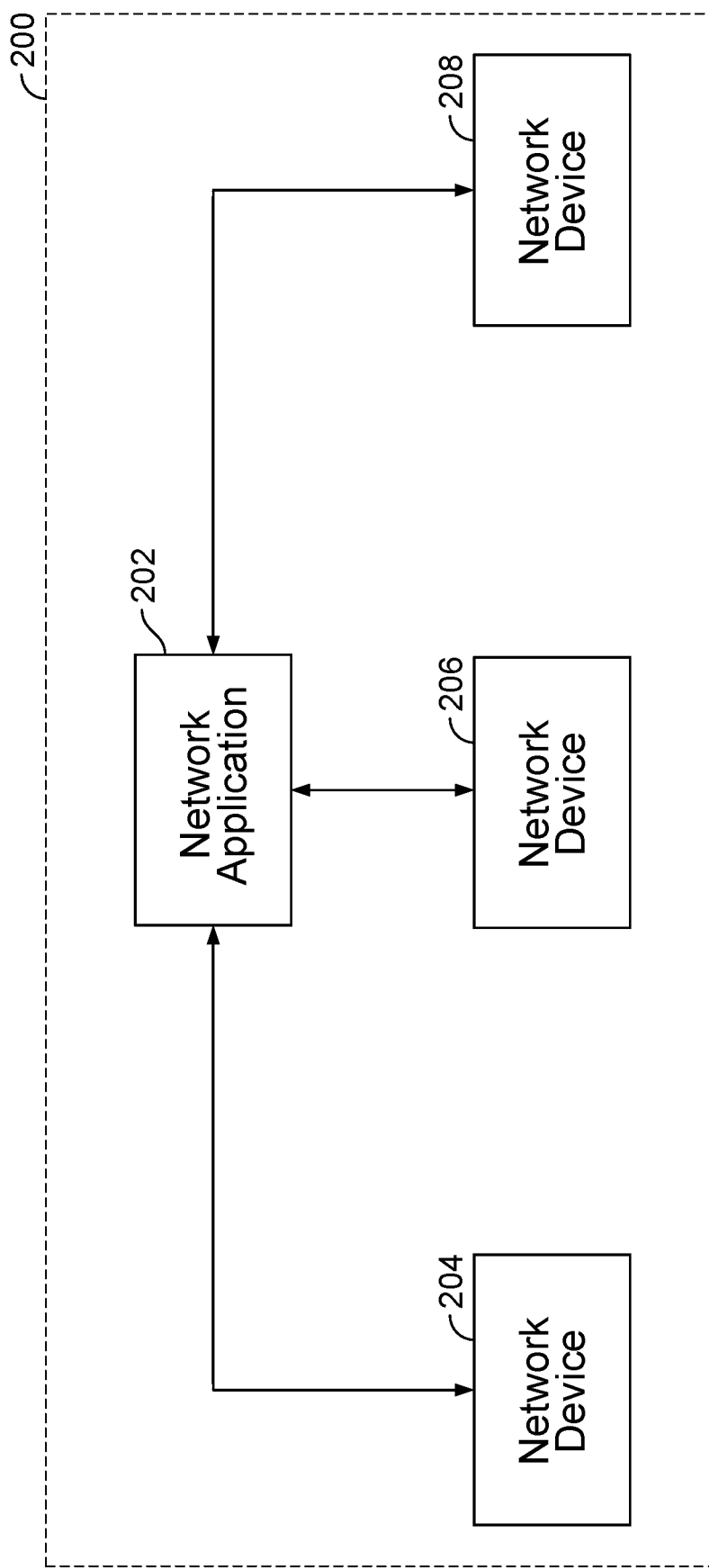
FIG. 2 is a functional block diagram of a network environment of a system for monitoring and analysis of interactions between network endpoints in accordance with some embodiments.

FIG. 2 is a functional block diagram of a network environment of a system for monitoring and analysis of interactions between network endpoints in accordance with some embodiments. As shown, a network 200 (e.g., an enterprise network) includes a network application 202 that is in communication with network devices 204, 206, and 208. For example, network application 202 can implement the activities described above with respect to FIG. 1. As such, the network devices can include DNS devices (e.g., DNS appliances/servers) in the network (e.g., the enterprise network). The network application can communicate with the network devices to collect DNS response data as similarly described above with respect to FIG. 1 and further described below. In an example implementation, the network application is an application executing on a platform (e.g., the disclosed telemetry platform, which can include various interfaces/APIs that facilitate the design of such applications to integrate with/use various functions/services provided by the telemetry platform, etc.), such as further described below. As would be apparent to one of ordinary skill in the art, the network 200 can include various other network devices, including virtual network devices or SDN devices, such as further described below.

Figure 3:
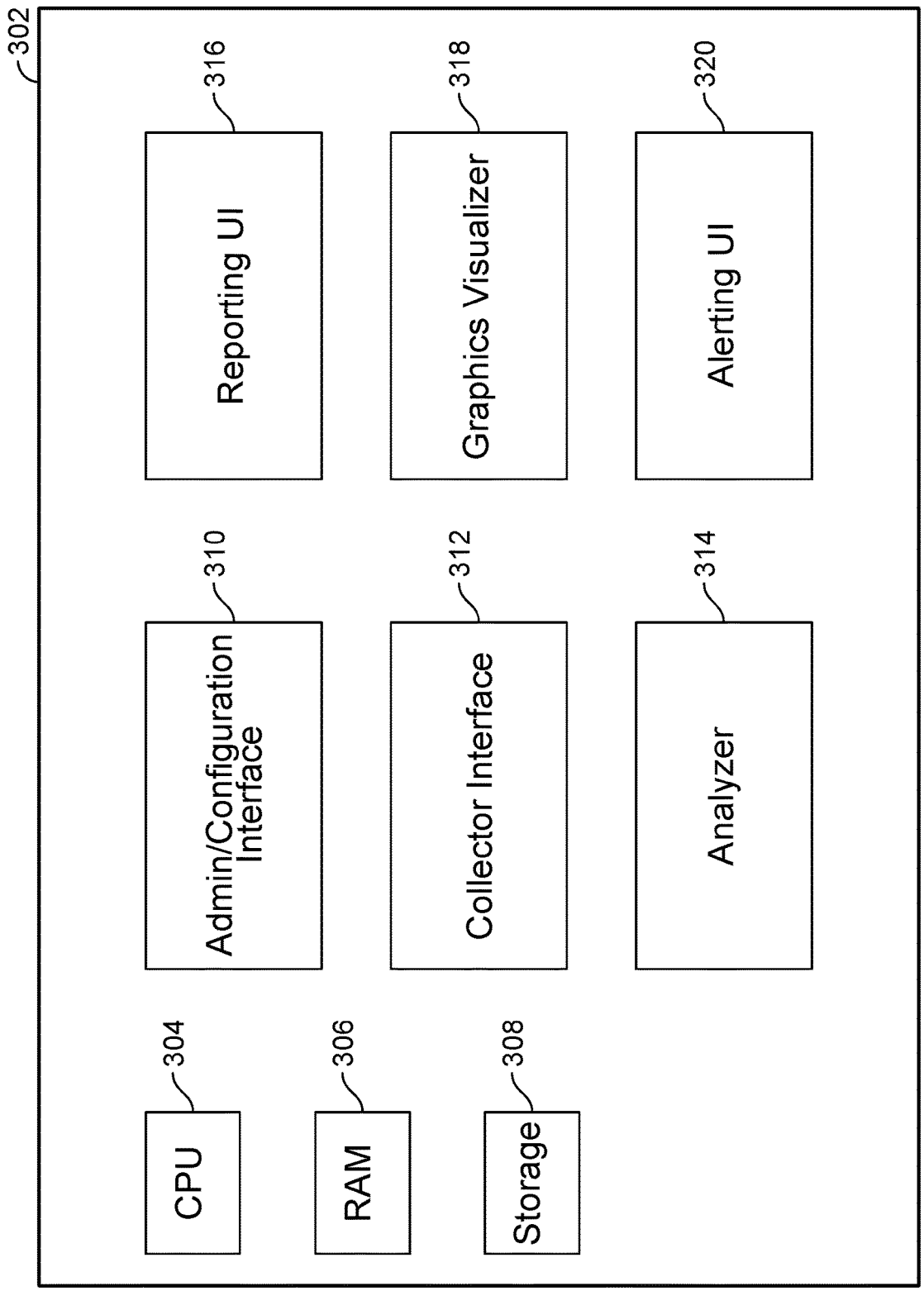
FIG. 3 is a functional block diagram of a system for monitoring and analysis of interactions between network endpoints in accordance with some embodiments.

FIG. 3 is a functional block diagram of a system for monitoring and analysis of interactions between network endpoints in accordance with some embodiments. As shown, system 302 includes a CPU 304, a RAM 306, and a data storage 308. In addition, system 302 includes various components (e.g., components for implementing various functions/services, as described below) of a network application/platform (e.g., the network application/platform as similarly described above with respect to FIGS. 1 and 2).

As shown, system 302 includes an admin/configuration interface 310. For example, the admin/configuration interface can provide a user interface (e.g., and, in some cases, a programmatic interface, such as through API(s), which can be used by an application/network application for accessing various functions/services provided by the disclosed telemetry platform) for configuring the network application to collect various endpoint interaction data and/or to generate various graphical visualizations and/or reports based on the collected and analyzed endpoint interaction data, such as similarly described above and further described below.

As also shown, system 302 includes a collector interface 312. For example, the collector interface can collect endpoint interaction data from one or more collectors, such as DNS response data collected from a DNS device and/or SDN/virtual network devices such as OpenFlow switches, as similarly described above and further described below. In an example implementation, the collector interface includes a controller (e.g., an SDN controller) for configuring and communicating with an SDN device(s) (e.g., an OpenFlow switch), such as further described herein with respect to various embodiments.

As also shown, system 302 includes an analyzer 314. For example, the analyzer can perform (near real-time) analysis of the endpoint interaction data, such as to perform one or more community algorithms to group endpoint interaction data and/or perform other analysis to identify endpoints associated with anomalous/suspicious endpoint interactions, as similarly described above and further described below. In an example implementation, the analyzer can also include a filter for filtering the collected endpoint interaction data based on various default and/or configured filtering rules, as similarly described above and further described below.

As also shown, system 302 includes a reporting user interface (UI) 316. For example, the reporting UI can generate reports based on the monitored/analyzed endpoint interaction data, as similarly described above and further described below.

As also shown, system 302 includes a graphics visualizer 318. For example, the graphics visualizer can generate graphical representations, such as graphs, charts, and/or tables, of the monitored/analyzed endpoint interaction data, as similarly described above and further described below. In an example implementation, the graphics visualizer is implemented using a commercially available or open source graphics package, such as the open source JavaScript library D3.js for graph visualization available at d3js.org.

As also shown, system 302 includes an alerting user interface (UI) 320. For example, the alerting UI can generate alerts based on the monitored/analyzed endpoint interaction data (e.g., based on default and/or customized configuration settings to generate alerts based on various events/thresholds associated with the monitored/analyzed endpoint interaction data, such as if one or more endpoints are determined to connect to an unauthorized endpoint and/or to connect to a suspicious/malware endpoint, etc.), as similarly described above and further described below.

Each of these components is further described below with respect to various embodiments. In some implementations, one or more of these components can be performed by another device (e.g., another computing device, such as using a distributed computing architecture, a cloud-based service environment, and/or a virtualized computing environment) or component, such as the analyzer can be performed using another device or component. In some implementations, one or more of these components can be integrated, such as the reporter and alerting component(s) can be implemented as an integrated component of the network application and/or platform (e.g., telemetry platform, such as further described below). In some implementations, a subset of these functions/components can be included in the network application and/or platform (e.g., telemetry platform, such as further described below). In some implementations, additional components, such as a database (e.g., an in-memory database) for storing the collected endpoint interaction data and for storing the filtered/analyzed collected endpoint interaction data can be included in the network application and/or platform (e.g., telemetry platform, such as further described below). In some implementations, one or more of these components can be implemented using programmed hardware (e.g., ASICs/FPGAs) and/or using combinations of computing hardware and software executed on the computing hardware.

For example, system 302 can implement the activities described above with respect to FIG. 1 and can also be used to implement and execute the network application and/or platform (e.g., telemetry platform, such as further described below) for the enterprise network as described above with respect to FIG. 2. For example, collected endpoint interaction data can be processed using CPU 304 and RAM 306 and stored in storage 308.

In an example implementation, the network application is a distributed online real-time, big data graph clustering and index computation application, such as further described herein. The network application interacts with an analytics platform for the network application. The analytics platform is an integrated, network telemetry and analytics software platform (e.g., also referred to herein as the telemetry platform), such as further described herein.

In an example implementation, the network application and the telemetry platform can be executed on commercial off-the-shelf (COTS) hardware (e.g., server class hardware or, in some cases, a laptop or desktop computer). As further described below, the network application and the analytics platform are easy to deploy, requiring very little change to existing network infrastructure (e.g., of an enterprise network on which the network application and the analytics platform are deployed for monitoring and analyzing interactions between endpoints).

In an example implementation, the telemetry platform includes an integrated collection of components for data collection, aggregation, analytics, and visualization. In this example implementation, the same software program can perform (near) real-time analytics as well as perform data collection from the network as all the functions of data collection, aggregation, and analytics can be embedded in the disclosed telemetry platform. As further described below, the telemetry platform is a new and efficient architecture, which, for example, facilitates providing full control to the application developer to seamlessly configure what network data that is collected, how the collected network data is analyzed, and how such analyzed network data is displayed. As also further described below, the telemetry platform is flexible and can be used to support many applications around network telemetry, security, analytics, and control based on this platform.

For example, the disclosed telemetry platform architecture is in contrast to the common practice of using separate systems, such as Hadoop or Spark for big data analytics, and feeding the data collected by a separate mechanism, which generally involves the assistance of developers, admins, and systems that are different in nature for performing the two separated tasks. However, as will be apparent to those of ordinary skill in the art, the various techniques disclosed herein for monitoring and analyzing interactions between endpoints can also be implemented using the more common practice of using separate systems, such as Hadoop or Spark for analytics, and feeding the data collected by a separate mechanism.

For example, interactions between endpoints in a network can be examined and grouped into network activities based on how closely a group of endpoints is interacting among themselves as compared to how sparsely the same group of endpoints interacts with other endpoints/groups of endpoints. A network's complexity can also be quantified from the number of groups or activities and the size of those activities. In some cases, larger, tightly knit activities can indicate a more complex network as further discussed below.

Graphical Representations of Interactions Between Endpoints

In one embodiment, various forms of graphical representations are generated of interactions between endpoints. For example, the graphical representations of interactions between endpoints can be generated using the network application/platform as similarly described above with respect to FIGS. 1-3 and/or as further described below with respect to various embodiments.

Figure 4:
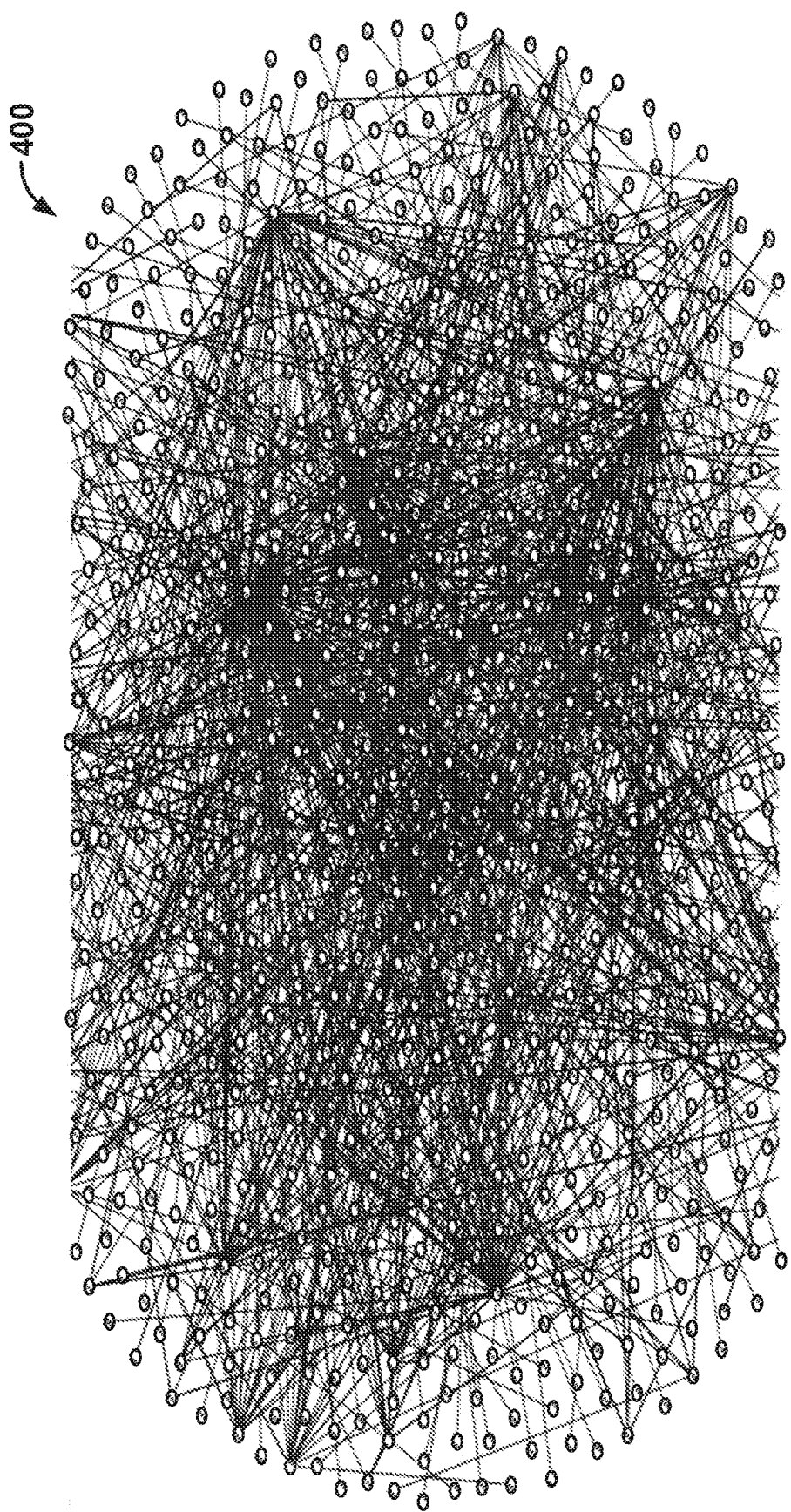
FIG. 4 is a diagram that shows a graph of endpoint interactions in accordance with some embodiments.

FIG. 4 is a diagram that shows a graph of endpoint interactions in accordance with some embodiments. In particular, FIG. 4 shows a graph 400 of the endpoint interactions where the endpoints are shown by dots that each correspond to an endpoint and edges that each indicate an interaction between two endpoints (e.g., for an enterprise deployment example, such can be representative of millions of endpoint interactions for hundreds of thousands of endpoints (unique IP addresses)). In an example implementation, the "hairball" of the interactions between endpoints as shown in FIG. 4 can be analyzed using various techniques, such as community detection algorithms and/or other algorithms as further described below, to identify groups of endpoints that are interacting more closely among themselves and relatively sparsely with endpoints in other groups, the result being much like finding knots in a hairball.

In one embodiment, a system/process/computer program product for monitoring and analysis of interactions between network endpoints includes enhanced visualization and navigation of graphs (e.g., including large graphs, such as graphs with at least 1 million nodes and 10 million edges). For example, in dealing with large graphs, improved visualization and navigation facilitates a better understanding of the underlying network data represented by such large graphs, such as further described below. In an example implementation, various domain level heuristics can be implemented to partition a graph in addition to the automatic partitioning done by community detection, such as further described below.

In one embodiment, a system/process/computer program product for monitoring and analysis of interactions between network endpoints includes a capability to scale to large graphs (e.g., such as graphs with at least 1 million nodes and 10 million edges). For example, the disclosed NCI/Tapestry application can be applied to any endpoint interactions (e.g., any graph structure, such as Facebook friends or Twitter followers). As such, the capability to scale to billions of edges and endpoints can be useful for various applications.

Figure 5:
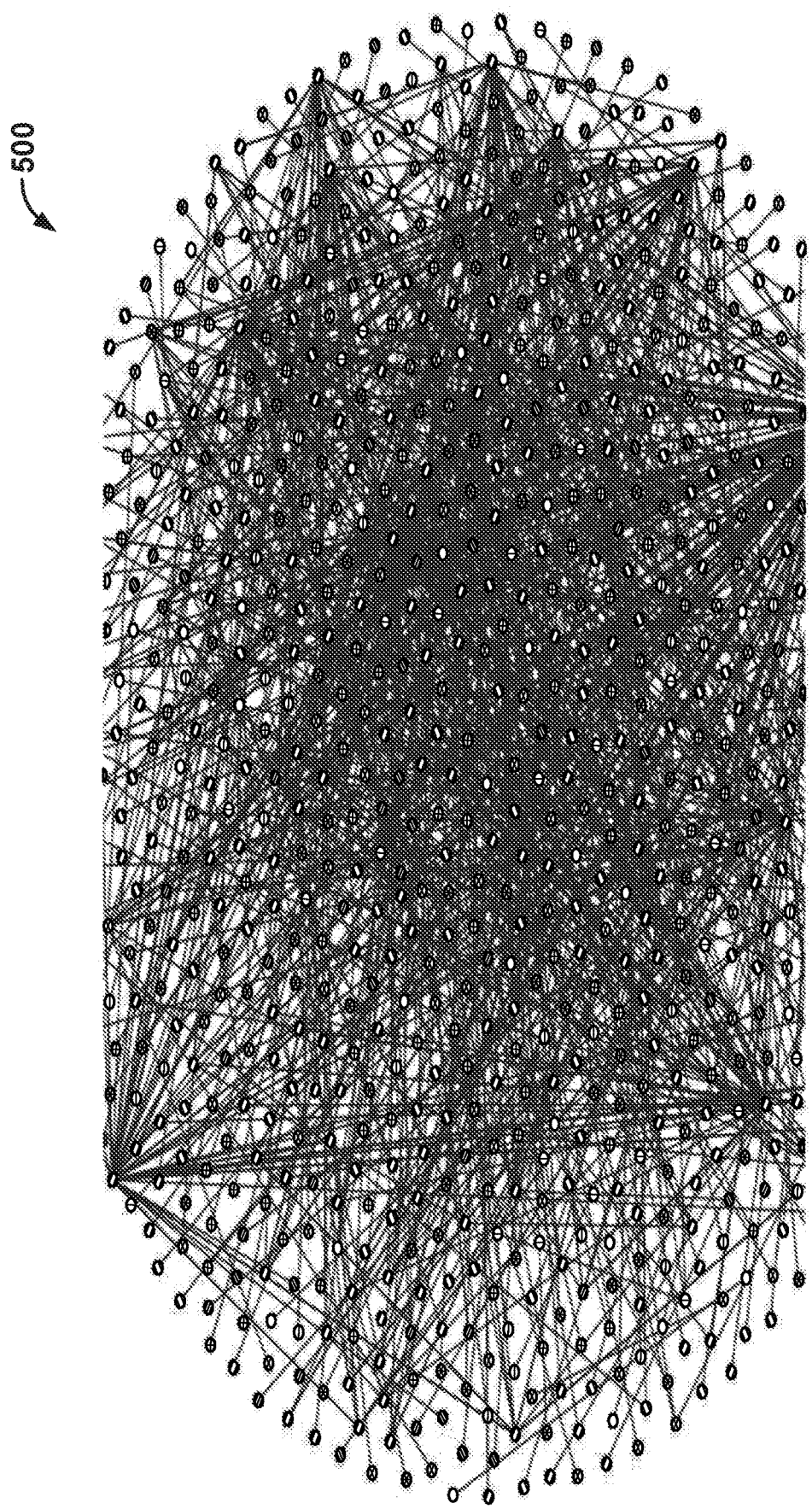
FIG. 5 is another diagram that shows a graph of endpoint interactions in accordance with some embodiments.

FIG. 5 is another diagram that shows a graph of endpoint interactions in accordance with some embodiments. In particular, FIG. 5 shows a graph 500 of the same set of endpoint interactions that are represented in graph 400 of FIG. 4, but with the endpoints separately indicated using distinct visual indicators (e.g., using colors, labels, grey-scale, and/or other visual/graphical indicators) according to the activity into which they were classified.

Figure 6:
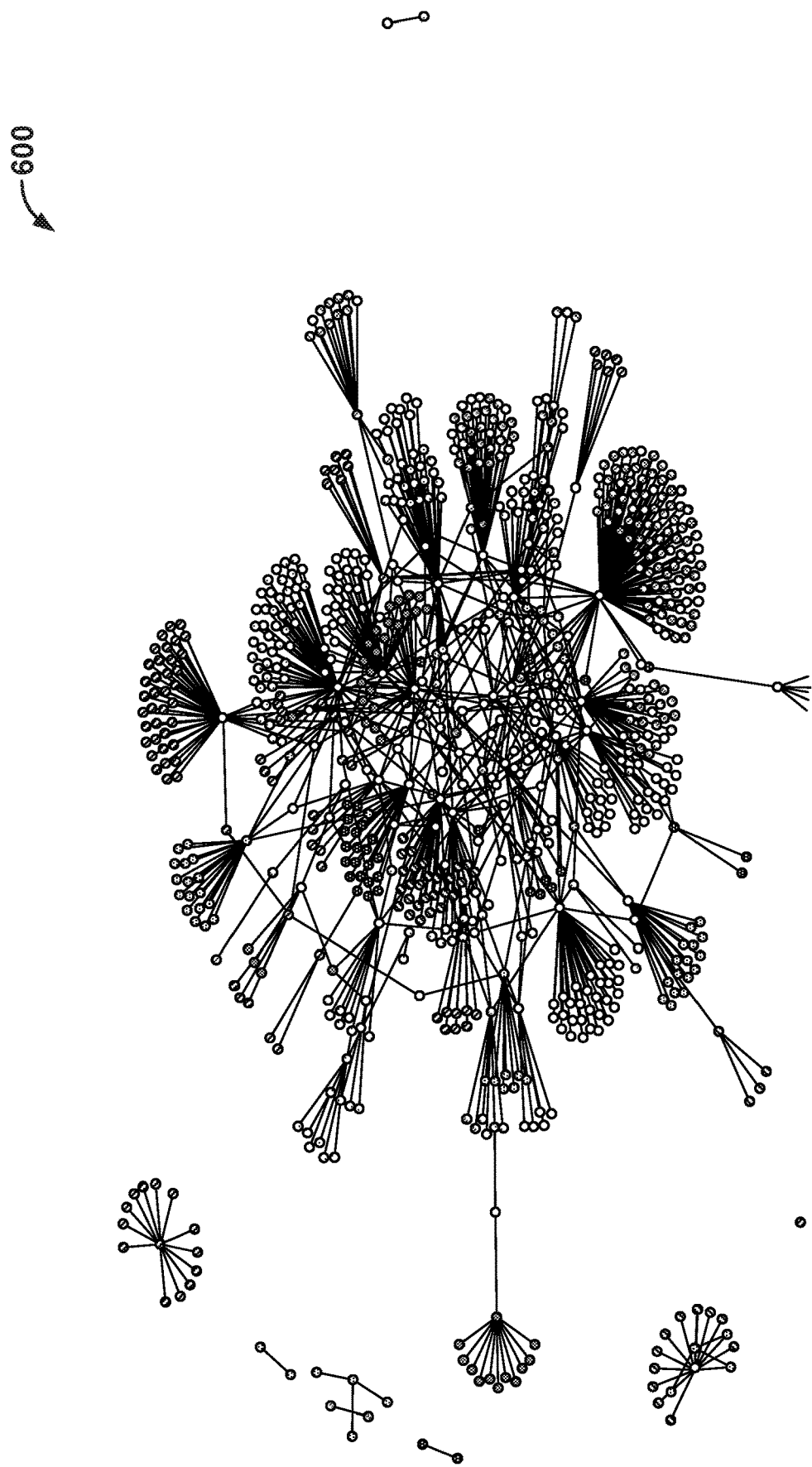
FIG. 6 is another diagram that shows a graph of endpoint interactions in accordance with some embodiments.

FIG. 6 is another diagram that shows a graph of endpoint interactions in accordance with some embodiments. In particular, FIG. 6 shows a graph 600 of the same set of endpoint interactions that are represented in graph 500 of FIG. 5, but graph 600 is generated to show the different groups or "activities" identified using distinct visual/graphical indicators (e.g., as similarly described above with respect to FIG. 5) and grouped accordingly in the graphical representation as shown.

In one embodiment, a system/process/computer program product for monitoring and analysis of interactions between network endpoints includes support of time series data, such as counts, which can be associated with endpoint interactions. For example, such time series data can improve community detection as well as add a time dimension to the endpoint interaction visibility, such as further described below.

In one embodiment, a system/process/computer program product for monitoring and analysis of interactions between network endpoints includes support for real-time updates (e.g., near real-time updates) to the graph visualization. For example, near real-time updates to the graph visualization of network endpoint interactions can facilitate various security use case scenarios, such as further described below.

In one embodiment, a system/process/computer program product for monitoring and analysis of interactions between network endpoints includes partitioning a graph visualization of network endpoint interactions in different ways (e.g., which can be executed as separate instances that can be executed in parallel). For example, a graph visualization of network endpoint interactions can be partitioned based on internal/intranet and external activities (e.g., partitioned based on internal endpoint interactions and external endpoint interactions); browsing versus advertising (ad) networks; engineering group versus finance group within an enterprise (e.g., or other group partitions that are specified in a given enterprise network); and/or based on other criteria/metadata, such as further described herein.

Figure 7:
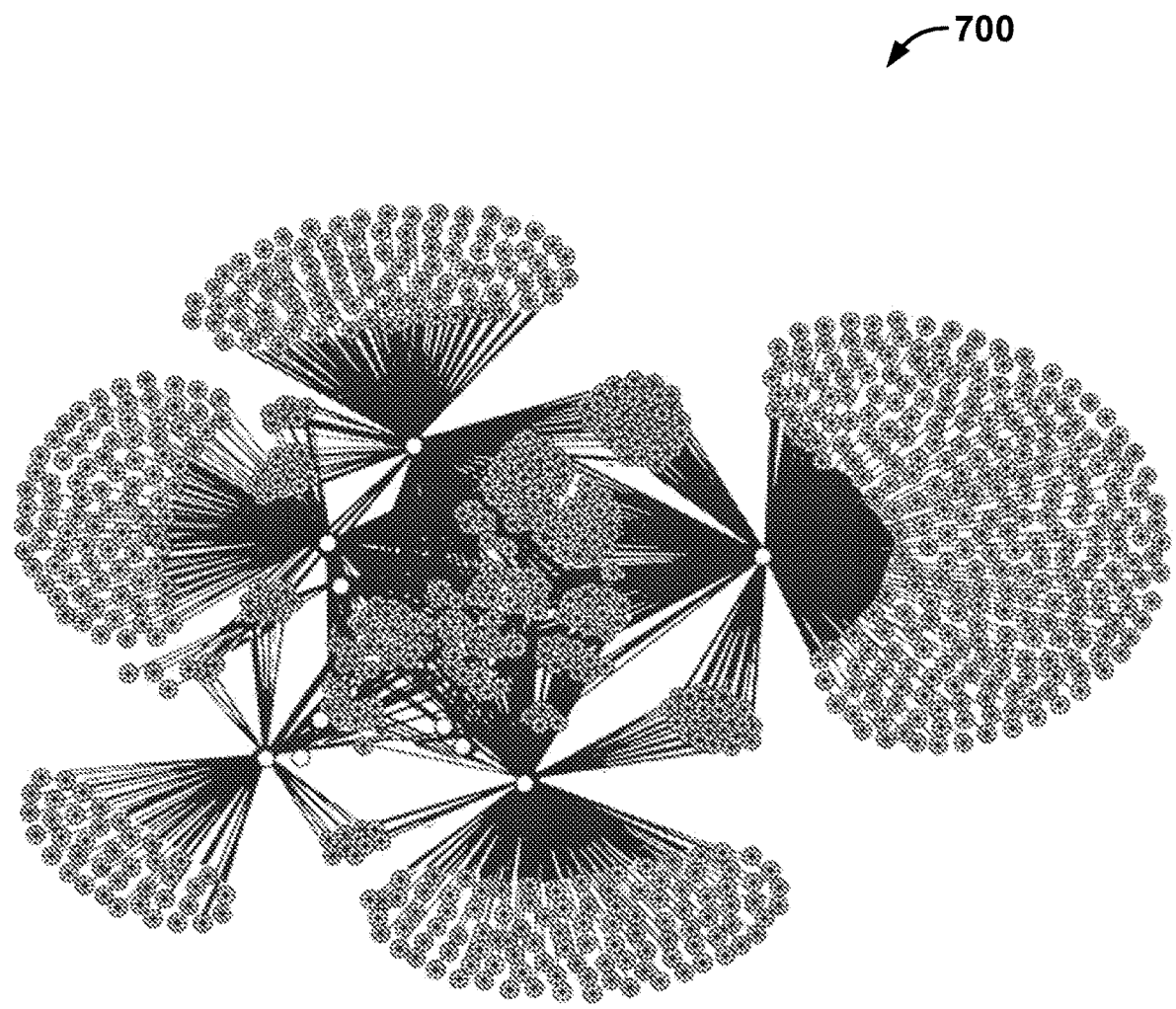
FIG. 7 is another diagram that shows a graph of endpoint interactions in accordance with some embodiments.

FIG. 7 is another diagram that shows a graph of endpoint interactions in accordance with some embodiments. In particular, FIG. 7 shows a graph 700 that is a graphical representation of the interactions between endpoints within one activity, which corresponds to one of the multiple activities/groups that are represented in graph 600 of FIG. 6.

Figure 8:
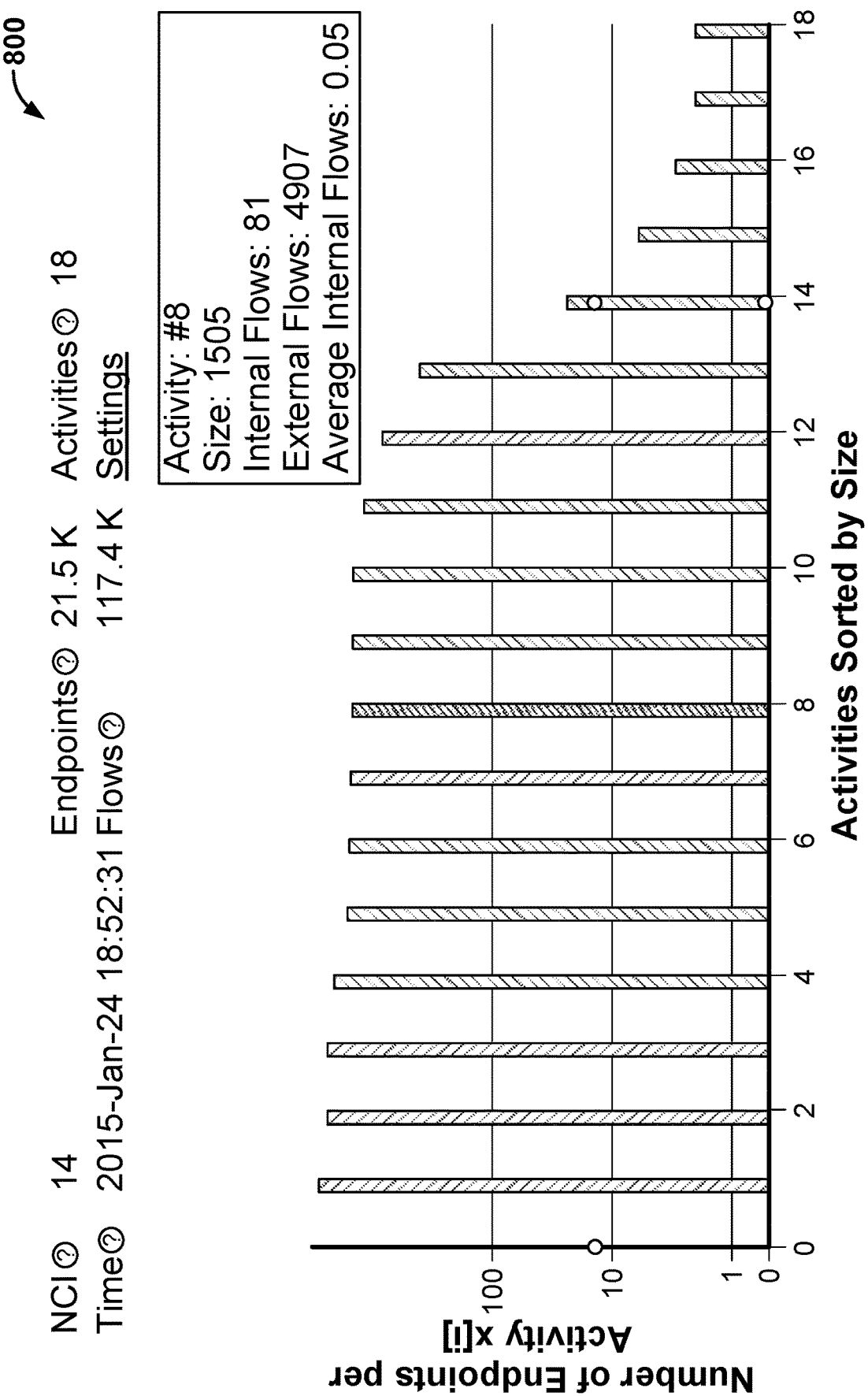
FIG. 8 is a diagram that shows a histogram of endpoint interactions in accordance with some embodiments.

FIG. 8 is a diagram that shows a histogram of endpoint interactions in accordance with some embodiments. Specifically, FIG. 8 shows a histogram 800 that provides a representation of the activities sorted by size, which correspond to the activities/groups that are represented in graph 600 of FIG. 6. More specifically, the activities identified by the analysis are ordered based on their size as shown in histogram 800.

FIG. 9 is a diagram that shows a table of endpoint interactions in accordance with some embodiments. In particular, table 900 of FIG. 9 provides a more detailed view into endpoints in the network, showing the nature of their interactions, whether they are to internal or external endpoints (e.g., whether the devices are internal to the enterprise network or external to the enterprise network, such as an external web server or application server accessible from a computing device in the enterprise network via the Internet), which activity into which the endpoint was classified, and how they are connected to endpoints in other activities. As would be apparent to one of ordinary skill in the art, the fields of table 900 are just examples of the categories/type of information that the network application can monitor and analyze to bring out information deeply embedded in the network and provide such information to provide more insights into the endpoint interactions for endpoints associated with the enterprise network (e.g., without requiring the use of any other specialized tool or setup on the enterprise network).

Figure 10:
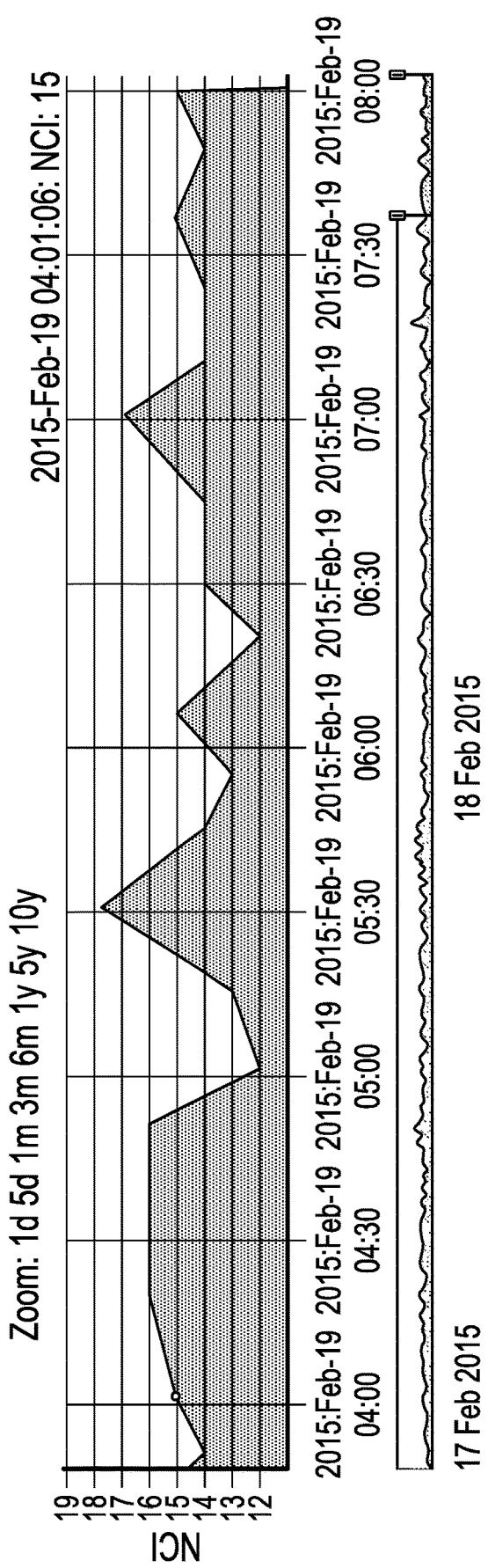
FIG. 10 is a diagram that shows a chart of a calculated Network Complexity Index (NCI) based on endpoint interactions associated with an enterprise network in accordance with some embodiments.

FIG. 10 is a diagram that shows a chart of a calculated Network Complexity Index (NCI) based on endpoint interactions associated with an enterprise network in accordance with some embodiments. In one embodiment, the network application tracks the NCI for the enterprise network over time and displays a chart with historical values as well as the current value of the NCI, such as shown in chart 1000 of FIG. 10. This chart is an NCI dashboard that provides a quick view into how the network has behaved over time. A sudden big change to the NCI is generally expected to correlate/indicate big changes in the network. For example, deployment of a new application such as Hadoop in an enterprise can affect the NCI of that enterprise network.

In one embodiment, the Network Complexity Index (NCI) can be calculated for the network based on the monitored endpoint interactions. For example, the NCI can be calculated as a single number indicating how many "knots" of significant size are present in the graph.

In an example NCI calculation, the NCI can be calculated as follows:

$$NCI(N) = \text{Max } j, X[j] >= j$$

where NCI(N) is the Network Complexity Index of network N and X[j] is the number of endpoints engaged in an activity (e.g., the number of endpoints in an activity/group, such as similarly described above and further described below). The NCI is further described in a white paper available at http://www.flowforwarding.org/nci-article.

In an example implementation, the NCI dashboard as shown in FIG. 10 provides a quick view into the operation of the network. The NCI dashboard is updated periodically and shows a time series chart of NCI. For example, the NCI dashboard can also provide an updated view into the collectors (e.g., such as the collectors described below) providing one or more of the following: endpoint interaction data, the number of endpoint interactions (e.g., also referred to sometimes as connections or flows), the total number of unique endpoints seen over a period of time, and the rate of data collection.

System Platform Architectures for Monitoring and Analyzing Interactions Between Network Endpoints In one embodiment, a telemetry platform is provided that facilitates performing the disclosed techniques for monitoring and analyzing interactions between network endpoints and on which a network application (e.g., an application designed to use/execute on the platform) can be executed using the telemetry platform to perform and process such network endpoint interactions to perform various different applications. For example, a variety of network applications can be implemented that execute on the telemetry platform to perform different applications based on such measurements and/or analysis, such as a network complexity measurement application, a network capacity and planning application, a network security application, and/or other applications as further described below.

Figure 11:
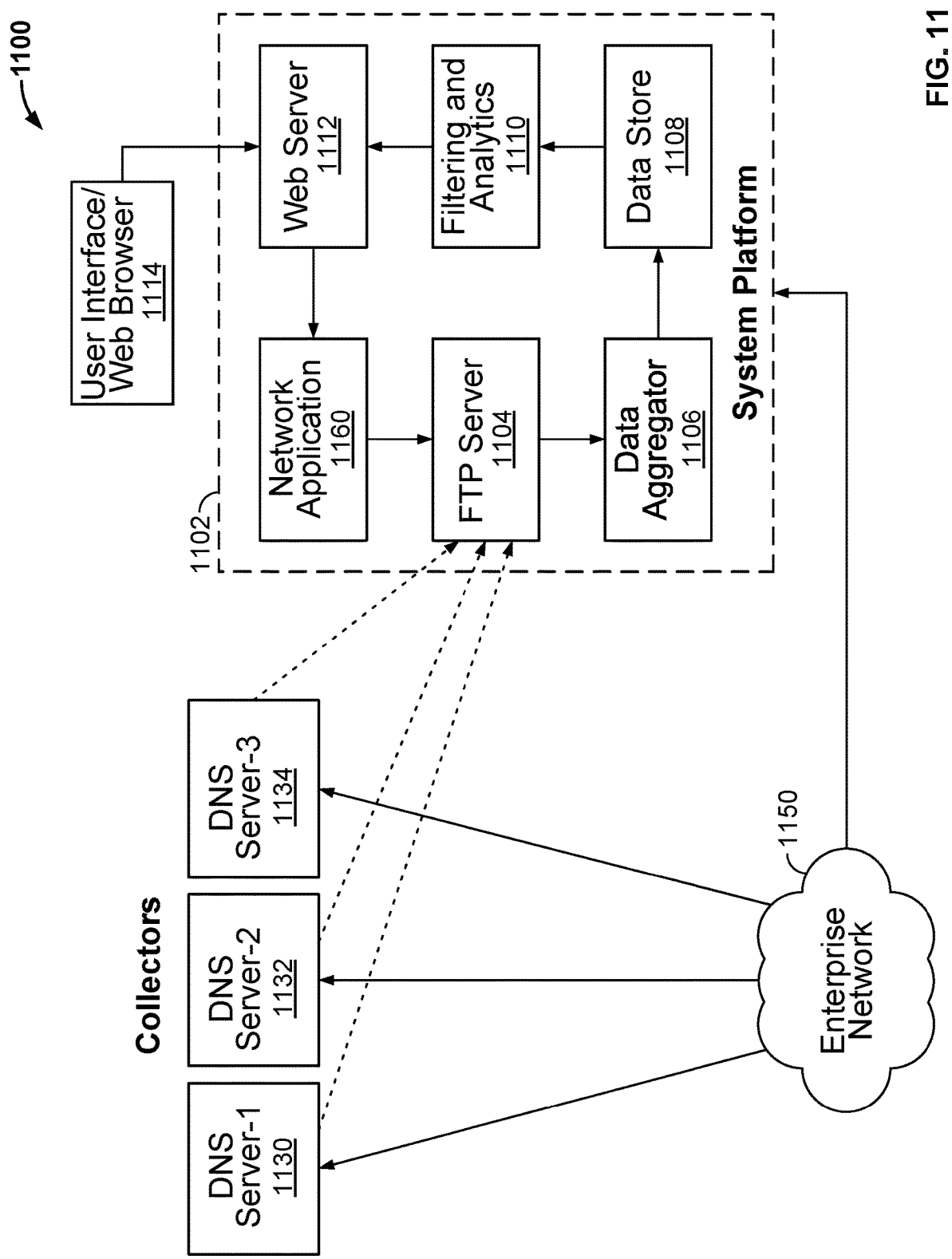
FIG. 11 is a functional block diagram of a system platform architecture for monitoring and analysis of interactions between network endpoints in an enterprise network in accordance with some embodiments.

FIG. 11 is a functional block diagram of a system platform architecture for monitoring and analysis of interactions between network endpoints in an enterprise network in accordance with some embodiments. In particular, a system platform architecture 1100 (e.g., a telemetry platform) for a network application 1160 (e.g., a network complexity measurement application such as Tapestry, such as described herein, or various other network applications, such as described below) can utilize the monitored and analyzed endpoint interactions for various different applications. As shown, a system platform 1102 for monitoring and analysis of interactions between network endpoints associated with an enterprise network 1150 is in communication with various collectors for the enterprise network. The collectors for the enterprise network include DNS servers 1130, 1132, and 1134. In this network environment, DNS servers 1130, 1132, and 1134 serve as the collectors of the DNS data as further described below.

For example, a network complexity measurement application such as described above (e.g., such as the above-described Tapestry application, which refers to a network application that can calculate the NCI for the enterprise network based on the monitored and analyzed endpoint interactions and present various reports and/or graphical visualizations based on the NCI and/or monitored and analyzed endpoint interactions as similarly described above) can be implemented to execute on/using system platform 1102. In particular, the platform is designed to support different techniques for network data collection, storage, analytics, and graphics visualization. As discussed above, the platform is designed to be flexible and to support the development of other applications that can similarly be executed on the same platform, and such applications can also involve collecting different network data, performing different analytics, and/or providing different visualizations. Various other applications, in addition to the above-described Tapestry application, are described below.

Referring to FIG. 11, the collectors (e.g., DNS response data collectors) include the DNS servers 1130, 1132, and 1134 for enterprise network 1150, which are in communication with system platform 1102. The collectors can provide positive DNS responses to an FTP server 1104 of system platform 1102 as shown. For example, the DNS servers (e.g., DNS servers or DNS appliances) can be configured to send their DNS logs to FTP server 1104. The received DNS data can be provided by FTP server 1104 to data aggregator 1106. For example, received DNS log data can be aggregated and parsed to capture the DNS requesting client IP address as well as the resolved DNS response IP address and the fully qualified domain name (FQDN) (e.g., and/or various other data, such as described herein). The parsed and extracted DNS data can be provided by data aggregator 1106 to data store 1108 for storing the data (e.g., the data can be stored using an in-memory data store for faster data access, or any other type of data store). The stored DNS data can be analyzed by filtering and analytics component 1110 (e.g., analyzer 314 of FIG. 3). Various filtering can be performed on the collected DNS data, such as to filter unresolved DNS requests (e.g., unresolved DNS requests can be removed as such does not provide data that corresponds to endpoint interactions/connections between endpoints), to whitelist and/or blacklist certain IP addresses, and/or to perform various other filtering of the DNS data, such as further described below. Various different analytics can be performed on the DNS data based on the DNS data and/or the network application that is utilizing the system platform, such as network application 1160 as shown. For example, assuming the Tapestry application is the network application executed on the system platform, then the analytics performed by analytics 1110 can include performing analytics for determining/calculating the NCI for enterprise network 1150 based on (real-time) endpoint interactions data as similarly described above.

As also shown, a user, such as a network/IT admin, can access a network application 1160 executed on the system platform via a user interface/web browser 1114 (e.g., executed on a client computing device, such as a smart phone, laptop, or desktop computer) that can communicate with a web server 1112 of the system platform to access network application 1160 executed on the system platform as shown. For example, the user can view reports, graphical representations, and/or other information generated by analytics 1110 and presented by the network application, such as similarly described above and further described below.

In one embodiment, the system platform (e.g., a telemetry and analytics platform) includes one or more of the following features: a distributed architecture for each component for scalability and performance; support for different data collection methods and utilities (e.g., data can be collected from DNS/other logs and/or span ports); access tracking and control (e.g., to support different categories of users, different access rights can be provided; as an example, not all users may not be permitted to view all the FQDNs); support input filtering (e.g., such data is collected from known/trusted sources only); and provide a scalable rendering engine for rendering graphs (e.g., large graphs) executed on a server that is navigable from a client device.

As would be apparent to those of ordinary skill in the art, the above-described system platform architecture can be similarly applied to various different network environments. In some implementations, one or more of these functions/ components of the system platform can be performed by another device or function, such as the web server can be performed using another device. In some implementations, one or more of these components can be integrated components, such as the filtering and analytics components can be implemented as an integrated component as shown or as distinct components of the system platform.

Figure 12:
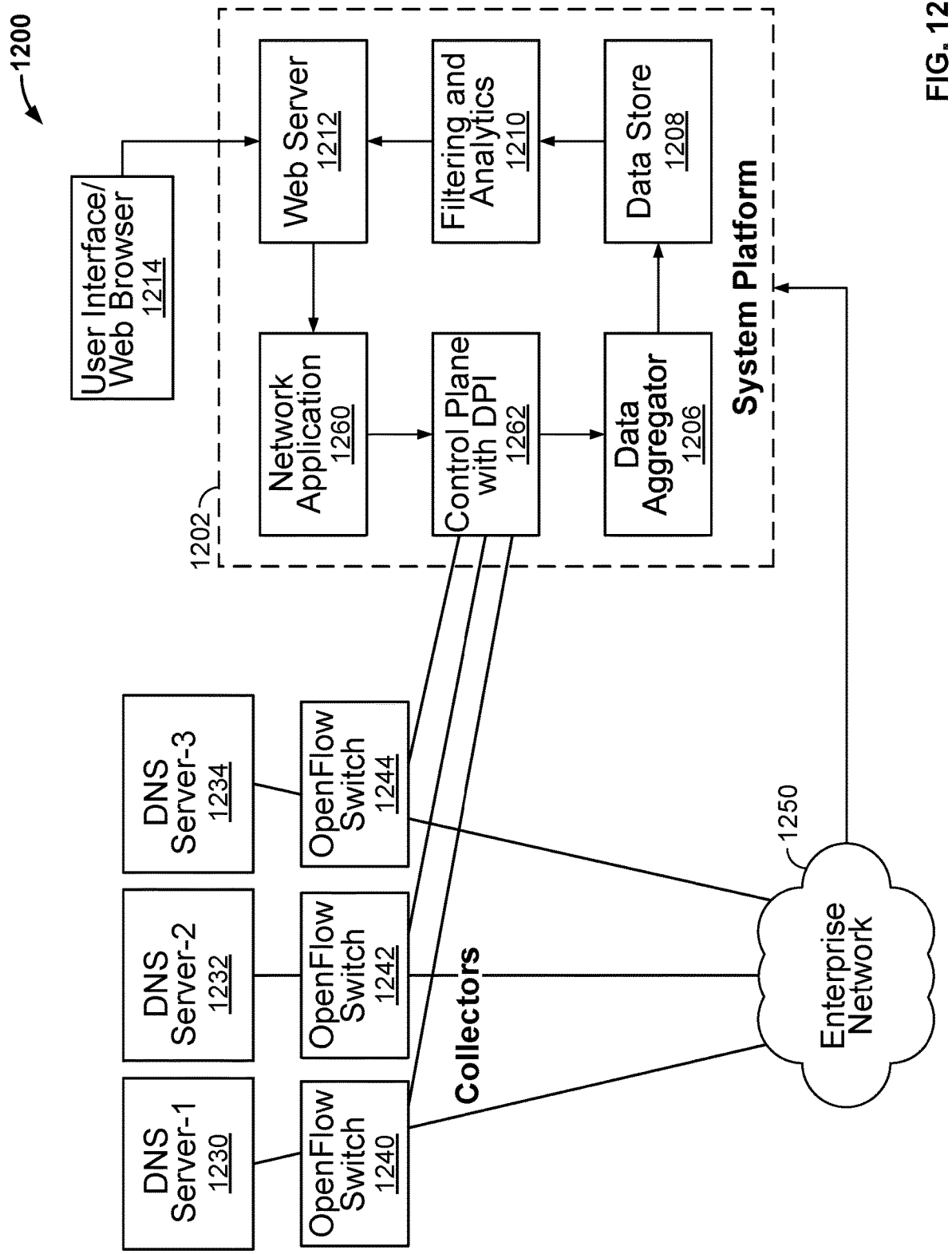
FIG. 12 is another functional block diagram of a system platform architecture for monitoring and analysis of interactions between network endpoints in an enterprise network in accordance with some embodiments.

FIG. 12 is another functional block diagram of a system platform architecture for monitoring and analysis of interactions between network endpoints in an enterprise network in accordance with some embodiments. FIG. 12 provides a system platform architecture 1200 (e.g., a telemetry platform) that is similar to system platform architecture 1100 of FIG. 11 except that this example system platform 1202 supports an enterprise network environment that includes OpenFlow switches. As shown, enterprise network 1250 includes OpenFlow switches 1240, 1242, and 1244 that are in communication with DNS servers 1230, 1232, and 1234. In this network environment, OpenFlow switches 1240, 1242, and 1244 serve as the collectors of the network data (e.g., DNS responses data and/or other network data) as further described below.

Referring to FIG. 12, a system platform 1202 includes a control plane with deep packet inspection (DPI) 1262 (e.g., an OpenFlow controller) that is in communication with OpenFlow switches 1240, 1242, and 1244. In this embodiment, the collectors (e.g., DNS responses/network data collectors) include the OpenFlow switches 1240, 1242, and 1244 for enterprise network 1250, which are in communication with system platform 1202. In particular, the collectors, which are OpenFlow switches 1240, 1242, and 1244 in this embodiment, are configured to provide positive DNS responses to a control plane with deep packet inspection (DPI) 1262 (e.g., a software-defined networking (SDN)/OpenFlow controller) of system platform 1202 as shown. For example, the OpenFlow switches can be configured via a network application 1260 and control plane with DPI 1262 (e.g., an OpenFlow controller) to match and tap DNS responses (e.g., in some cases, including various other DNS related data and/or network related data) that pass through the OpenFlow switches, as shown in FIG. 12. The DNS data can then be provided to data aggregator 1206. For example, the DNS response data that is received by control plane with DPI 1262 can be aggregated and parsed by data aggregator 1206 to capture the DNS requesting client IP address as well as the resolved DNS response IP address and the fully qualified domain name (FQDN) (e.g., and/or various other data, such as described herein). The parsed and extracted DNS data can be provided by data aggregator 1206 to data store 1208 for storing the data (e.g., the data can be stored using an in-memory data store for faster data access, or any other type of data store). The stored DNS data can be filtered and analyzed by filtering and analytics 1210 (e.g., analyzer 314 of FIG. 3). Various different analytics can be performed on the DNS data based on the DNS data and/or the network application that is utilizing the system platform, such as network application 1260 as shown. For example, assuming the Tapestry application is the network application executed on the system platform, then the analytics performed by analytics 1210 can include performing analytics for determining/calculating the NCI for enterprise network 1250 based on (real-time) endpoint interactions data as similarly described above.

As also shown, a user, such as a network/IT admin, can access a network application 1260 executed on the system platform via a user interface/web browser 1214 (e.g., executed on a client computing device, such as a smart phone, laptop, or desktop computer) that can communicate with a web server 1212 of the system platform to access network application 1260 executed on the system platform as shown. For example, the user can view reports, graphical representations, and/or other information generated by analytics 1210 and presented by the network application, such as similarly described above and further described below.

As would be apparent to those of ordinary skill in the art, the above-described system platform architecture can be similarly applied to other SDN-based devices and various different network environments. In some implementations, one or more of these functions/components of the system platform can be performed by another device or function, such as the web server can be performed using another device. In some implementations, one or more of these functions can be integrated components, such as the filtering and analytics components can be implemented as an integrated component as shown or as distinct components of the system platform.

As described above with respect to FIGS. 11 and 12, two types of data collectors are described with respect to these example system platform architectures: (1) receiving DNS logs from DNS servers via an FTP server of the system platform (e.g., in which DNS appliances/servers on the enterprise network can be configured by a network/IT admin to send DNS log data to the FTP server of the system platform), such as shown in and described above with respect to FIG. 11; and (2) tapping DNS responses on the wire from SDN devices (e.g., OpenFlow switches or other SDN switches) via a control plane with DPI of the system platform, such as shown in and described above with respect to FIG. 12. In particular, as shown in the example network environment of FIG. 12, OpenFlow switches are located in front of the DNS servers and can be configured to match and tap DNS responses. The DNS responses can then be sent to the OpenFlow controller. With the ability to program appropriate rules into the OpenFlow switches, the network application executed on the system platform can be configured to have control of when and what type of network data is collected (e.g., providing a more general network data collection method that facilitates control over where, when, and what network data is collected by the telemetry platform), thereby providing a flexible and robust SDN telemetry platform and application that can also be performed in traditional network environments (e.g., as shown in and described above with respect to FIG. 11). For example, the OpenFlow/SDN controller can control where, when, and what data is collected, and such is not limited to DNS data and can facilitate more real-time data collection and can be located anywhere in the network.

Also, in a hybrid network environment in which OpenFlow/SDN switches are in a network that also has traditional/physical network switches, the OpenFlow/SDN controller techniques are compatible with the above-described FTP-based DNS log collection techniques. For example, the telemetry platform can include both an SDN controller as shown in FIG. 12 and an FTP server as shown in FIG. 11 to support both of the above-described mechanisms for network data collection to interface with both DNS devices and SDN devices, as similarly described above with respect to FIGS. 11 and 12.

As would be apparent to those of ordinary skill in the art, various other techniques can similarly be implemented to obtain such DNS related and/or other network data for network activities on an enterprise network using the above-described system platform architecture for various different network environments.

In an example implementation of the system platform architectures as shown in FIGS. 11 and 12, two types of data aggregators can be implemented, one for each type of collector. As described above, these data aggregators parse and prepare the DNS response data to be stored for further analysis. For example, when data is collected by using DNS logs received via FTP at the FTP server as shown in FIG. 11, lines of the log file(s) can be parsed to identify and extract the DNS requesting client IP address, the requested IP address, and the FQDN of the requested IP address. When data is collected by receiving tapped traffic including actual DNS responses as shown in FIG. 12, deep packet inspection (DPI) of the DNS responses can be performed to identify and extract the DNS requesting client IP address, the requested IP address, and the FQDN.

In an example implementation of the system platform architectures as shown in FIGS. 11 and 12, the data store can store the collected and aggregated DNS/network related data for further analysis. For example, the DNS response pairs of requesting and requested IP address pairs {V1, V2} can be stored as directed edges in an in-memory graph store where V1 and V2 are vertices in the graph with an edge between them. In an example implementation, the graph store can be implemented using Digraph of Erlang as further described herein or using an open source or commercially available graph database (e.g., the Cayley open source graph database released by Google and/or the Apache open source project's Titan graph database, or the commercially available Oracle Spatial and Graph database and/or GraphDB database, and/or various other open source or commercially available graph databases can similarly be used to implement the data store operations as described herein). Over time, as new edges are formed, the graph database captures a view of all the dynamic interconnections between endpoints (e.g., endpoint interactions that are visible based on monitoring DNS requests). For example, the captured view of all the dynamic interconnections can serve as an input to a network application that measures the complexity of a network and/or various other network applications as further described below. In some cases, other related metadata can also be stored on vertices as well as the edges in the graph (e.g., timestamp(s) associated with the monitored endpoint interactions, number of monitored connections between a given pair of endpoints, hostnames, MAC addresses, and/or other labels/metadata that can be automatically generated/imported/extracted, and/or based on user input/customization/configuration, etc.).

In an example implementation of the system platform architectures as shown in FIGS. 11 and 12, the system platforms include a web server. Generally, the web server can facilitate access to the platform and/or network application executed on the platform via a web protocol (e.g., HTTP, HTTPS, WebSocket, and/or other web-based network communication protocols) via a web browser executed on a client device as similarly described above. For example, for a network application for measuring network complexity (e.g., such as the Tapestry application described herein), the web server can facilitate the users to view a measured and determined Network Complexity Index (NCI) in real-time or for any chosen period of time (e.g., such as a graph measuring the NCI over time for the monitored enterprise network, such as shown in FIG. 10 as described above). In addition, the web server can provide a detailed view into an endpoint interactions graph, providing activity-based and endpoint-based information as described herein. In an example implementation, the web server can be implemented using a commercially available web server or using an open source/project web server such as Yaws (e.g., available at http://yaws.hyber.org/). Yaws is an HTTP high performance 1.1 web server written in the Erlang programming language (e.g., Erlang is a programming language used to build massively scalable soft real-time systems with requirements on high availability). Yaws is particularly well-suited for dynamic content web applications. Yaws supports the WebSocket protocol, which enables two-way communication between clients and web servers (e.g., providing full-duplex communications channels over a single Transmission Control Protocol (TCP) connection, and the WebSocket protocol is a web-based network communications protocol that was standardized by the IETF as RFC 6455). As such, in this example implementation, the web server of the system platform and the client device (e.g., using a web browser that supports the WebSocket protocol, such as the Google Chrome® browser or another commercially available or open source web browser that supports the WebSocket protocol) can communicate with each other using the WebSocket protocol.

In an example implementation of the system platform architectures as shown in FIGS. 11 and 12, the system platforms include a network application that is implemented to execute on the system platform as similarly described above. In an example implementation, the network application (e.g., such as the Tapestry application described herein and/or other network applications, such as also described herein) can provide a user interface (UI) (e.g., a graphical user interface (GUI)) that can be implemented as a web client that uses hypertext markup language (HTML), cascading style sheets (CSS), and the JavaScript scripting/programming language (e.g., in a web page). The UI for the network application can also be implemented to support network communications using the WebSocket protocol to communicate with the web server of the system platform. For example, the Tapestry UI application programming interface (API) provides a rich interface that allows users to delve into various details of network endpoint interactions as described herein.

In an example implementation, the network application (e.g., such as the Tapestry application described herein and/or other network applications, such as described herein) belongs to a family of applications that can utilize the control plane software (e.g., control plane with DPI 1262 of FIG. 12) to program SDN switches (e.g., OpenFlow switches 1240, 1242, and 1244 of FIG. 12). For example, the NCI application can use the control plane software (e.g., controller) to send setup rules to SDN switches in order to tap DNS traffic and also to collect the tapped DNS traffic.

In an example implementation, the control plane (e.g., control plane with DPI 1262 of FIG. 12) is an OpenFlow control platform to provide a scalable and robust OpenFlow-based distributed, yet logically centralized controller fabric to control OpenFlow-based switch fabric that can increase in size (e.g., such as a network that can grow to thousands of OpenFlow switches). For example, the control plane facilitates functionality for the requirements of the network data collection for the network application using OpenFlow switches.

Techniques for Analyzing Interactions Between Network Endpoints

In one embodiment, various techniques are disclosed for analyzing interactions between network endpoints as further described below.

Network interconnections of any type (e.g., network endpoint interactions) are of increasing importance for monitoring different aspects of networks. As such, community detection and analysis is becoming an important field of analysis that can be applied in various applications for monitoring different aspects of real-world networks.

Generally, a network is said to have community structure if the nodes of the network can be grouped into sets of nodes such that each set of nodes is densely connected internally and more sparsely connected outside the group. The number of communities in a network and their sizes are not typically known beforehand, and they can be determined using a community detection algorithm. Various community detection algorithms are described below.

In an example implementation, a network application for determining the network complexity of a network based on monitored network endpoint interactions (e.g., such as the Tapestry application described herein) implements each of the following well-known community detection algorithms to automatically identify and group different activities using the network (e.g., to group different network endpoint interaction activities): (1) Label Propagation Algorithm (LPA); and (2) Louvain method. In other example implementations, the network application for determining the network complexity of a network based on monitored network endpoint interactions can implement one or more of any other community detection algorithms to automatically identify and group different activities using the network (e.g., to group different network endpoint interaction activities) and/or different combinations of such community detection algorithms (e.g., or just one of such community detection algorithms).

In this example implementation, a network application for determining the network complexity of a network based on monitored network endpoint interactions implements the Label Propagation Algorithm (LPA). For example, the Label Propagation Algorithm (LPA) is generally described in a paper by Usha Nandini Raghavan, Reka Albert, Soundar Kumara, "Near Linear Time Algorithm to Detect Community Structures in Large-Scale Networks," Physical Review E 76, 036106 (2007) (e.g., generally describing LPA as follows: The label propagation algorithm uses the network structure alone as its guide and requires neither optimization of a predefined objective function nor prior information about the communities. Every node is initialized with a unique label and at every step each node adopts the label that most of its neighbors currently have. In this iterative process densely connected groups of nodes form a consensus on a unique label to form communities.)

In this example implementation of LPA for determining the network complexity of a network based on monitored network endpoint interactions, each node is initialized with a unique label, and at every iteration of the algorithm, each node adopts a label that a maximum number of its neighbors have with ties broken uniformly randomly. As the labels propagate through the network in this manner, densely connected groups of nodes form a consensus on their labels. At the end of the LPA processing, nodes having the same labels are grouped together as communities. The advantage of LPA over the other techniques is generally its simplicity and time efficiency. LPA uses the network structure to guide its progress and does not optimize any specific chosen measure of community strengths.

Example pseudo code for an LPA implementation for determining the network complexity of a network based on monitored network endpoint interactions is provided below.

```
prop_labels(G)→
  random:seed( ),
  Vertices=digraph:vertices(G),
  SplitValue=random:uniform(length(Vertices)),
  {V1,V2}=lists:split(SplitValue,Vertices),
  V=V2++V1,
  RunCond=lists:foldl(fun(Vertex,Acc)→
    {StopCount,GoCount,G2}=Acc,
    Result=label_vertex(G,Vertex)
    case Result of
    go→
      {StopCount,GoCount+1,G2};
    stop→
      {StopCount+1, GoCount,G2}
      end
    end,{0,0,G},V),
  {NewStopCount,NewGoCount,G3}=RunCond,
  case NewGoCount>0 of
      true→
    prop_labels(G3);
      false→
    G3
  end.
```

For example, based on observations and testing, the implementation of LPA can effectively and efficiently group different network endpoint interaction activities when the numbers of vertices and edges in the graph are relatively small (e.g., less than 500, 5000 respectively). However, with an increasing size of the graph, it has been observed that many communities can effectively collapse into an increasingly large community. Thus, in this example implementation, variations of LPA are implemented to more effectively handle graphs of increasing size as described below with respect to the Louvain method.

In another example implementation, a network application for determining the network complexity of a network based on monitored network endpoint interactions implements the Louvain method. For example, based on observations and testing, the implementation of the Louvain method can effectively and efficiently group different network endpoint interaction activities even when the numbers of vertices and edges in the graph are relatively large (e.g., greater than 500, 5000 respectively). In particular, the implementation of the Louvain method for performing such community detection to group different network endpoint interaction activities greatly reduced the formation of one big community as was observed with the implementation of the LPA as described above. For example, the Louvain method is generally described in a paper at http://perso.uclouvain.be/vincent.blondel/research/louvain.html, such as describing the Louvain method as follows: "The Louvain method is a simple, efficient and easy-to-implement method for identifying communities in large networks. The method has been used with success for networks of many different types (see references below) and for sizes up to 100 million nodes and billions of links. The analysis of a typical network of 2 million nodes takes 2 minutes on a standard PC. The method unveils hierarchies of communities and allows to zoom within communities to discover sub-communities, sub-sub-communities, etc. It is today one of the most widely used method for detecting communities in large networks."

Generally, the Louvain method is a greedy optimization method that attempts to optimize the modularity of a partition of the network. Modularity is a benefit function that measures the quality of a particular division of a network into communities. For example, networks with high modularity have dense connections between the nodes within modules but sparse connections between nodes in different modules.

Specifically, in this example implementation of the Louvain method for determining the network complexity of a network based on monitored network endpoint interactions, the Louvain method optimization can generally be performed in two steps/phases (e.g., as also further described below). First, the Louvain method looks for small communities by optimizing modularity locally (e.g., modularity optimization). Second, the Louvain method aggregates nodes belonging to the same community and builds a new network whose nodes are the communities (e.g., community aggregation). These steps are repeated iteratively until a maximum of modularity is attained and a hierarchy of communities is produced. More specifically, the Louvain method implementation can be divided in two phases that are repeated iteratively. Assume that a weighted network of N nodes is provided. In the first phase, a different community can be assigned to each node of the network. Then, for each node i, consider the neighbors j of i and evaluate the gain of modularity that would take place by removing i from its community and by placing it in the community of j. The node i is then placed in the community for which this gain is maximum but only if this gain is positive. If no positive gain is possible, i stays in its original community. This process is applied repeatedly and sequentially for all nodes until no further improvement can be achieved and the first phase is then complete. In the second phase, a new network can be constructed whose nodes are now the communities determined during the first phase.

Although the exact computational complexity of the method is not known, based on observation and testing, the Louvain method has been observed to run in time O(n log n) with most of the computational effort spent on the optimization at the first level. Exact modularity optimization is generally known to be an NP-hard problem (e.g., a non-deterministic polynomial-time hard problem).

In one embodiment, a system/process/computer program product for monitoring and analysis of interactions between network endpoints includes support for other community detection algorithms, for example, to address the following: provide better resolution of communities, faster detection of communities, and the ability to efficiently handle even larger graphs (e.g., such as graphs with at least 1 million nodes and 10 million edges).

Additional Example Use Cases

In one example use case scenario, a network application executed on a telemetry platform (e.g., such as one of the system platforms described above) measures the complexity of a network (e.g., an enterprise network or other network) using a network complexity index (NCI) (e.g., such as the Tapestry application described herein), such as described above. In other example use case scenarios, a network application executed on a telemetry platform (e.g., such as one of the system platforms described above) can be performed to measure and/or determine various other aspects of a network (e.g., an enterprise network or other network) based on monitored network endpoint interactions, such as further described below.

In one embodiment, a network application executed on a telemetry platform (e.g., such as one of the system platforms described above) can be provided to facilitate anomaly detection for a network (e.g., an enterprise network or other network) based on monitored network endpoint interactions. As an example use case, if there is abnormal activity on the network reflected in abnormal DNS activity, then such abnormal DNS activity can be identified based on one or more abnormal NCI values (e.g., based on a threshold, such as to adaptively compute statistics of the NCI parameter (mean and standard deviation), and when the NCI value deviates by more than a given factor of the expected values, it can be considered as an abnormal value) determined using the above described NCI application (e.g., abnormal NCI results appearing in the time-series chart shown in FIG. 10). As another example use case, if there is abnormal activity on the network reflected in abnormal DNS activity, then such abnormal DNS activity can be identified based on an abnormal DNS query rate(s) collected at one or more of the collectors (e.g., based on a threshold, such as to adaptively compute statistics of the DNS query rate(s) (mean and standard deviation), and when the DNS query rate value deviates by more than a given factor of the expected values, it can be considered as an abnormal value).

In one embodiment, a network application executed on a telemetry platform (e.g., such as one of the system platforms described above) can be provided to facilitate network planning (e.g., network capacity planning) for a network (e.g., an enterprise network or other network) based on monitored network endpoint interactions. As an example use case, if a relatively steady increase in the NCI and flow rates (e.g., based on a threshold, such as an increase of the NCI and flow rates that do not deviate by more than a given factor of the expected values, it can be considered a normal increase (a steady increase)) is observed over time by the NCI/Tapestry or similar network application, then such can be used as an indicator that the network's complexity is increasing, and the increasing network complexity can generally be correlated with any new business processes and their endpoints to provide insights in network capacity planning for the enterprise network. For example, the histogram of endpoint interaction activities/groups sorted by size as shown in FIG. 8 can provide a deeper view into endpoint interactions. In particular, the histogram of activities of FIG. 8 shows all the activities, along with their sizes and nature of endpoint interactions, whether it is an internal interaction or an external interaction, in which external interaction means one of the endpoints was outside the enterprise network.

As another example use case of a network application executed on a telemetry platform for network capacity planning, monitored network endpoint interaction activities with more internal interactions can indicate more internal network traffic than external traffic (e.g., more east-west traffic inside the enterprise/corporate network). For example, such can be an indicator of more internal business processes in action, which can provide an indicator that more IT support will be needed to support the enterprise network.

As another example use case of a network application executed on a telemetry platform for anomaly detection for an enterprise network, any sudden increases in either internal or external endpoint interactions (e.g., based on a threshold, such as an increase of such endpoint interactions that deviate by more than a given factor of the expected values can be considered an abnormal increase (an anomaly detection/sudden increase) within a predetermined period of time, such as within five minutes) can indicate bursts of activity in the enterprise network. For example, a user (e.g., an IT/network admin) can bring up the endpoint interactions activity view as shown in FIG. 7 by clicking on a histogram bar corresponding to an activity. The graph of FIG. 7 clearly shows a lot of external interactions as shown by the grouped number of dots, which is typically a result of end user web browsing activities. In an example implementation, the FQDN and IP address of each endpoint in the activity can be shown both during mouse-over of a dot in the graph of FIG. 7 and/or can be shown in a table/chart format in another screen of the UI of the network application.

As another example use case of a network application executed on a telemetry platform for anomaly detection for an enterprise network, a long, low-tailed histogram can indicate many disconnected activities and can provide an indicator of suspicious network activity, because most current systems generally connect to some endpoints on the Internet, such as often for software updates.

As another example use case of a network application executed on a telemetry platform for anomaly detection for an enterprise network, any abnormal looking graph can be examined at greater depth. Large clusters of dots such as shown in FIG. 7 can be used, for example, to indicate high browsing activity. Symmetrical clusters can indicate some replicated activity, which can indicate various malware controlled access patterns. For example, any such abnormal graphs can be further examined by drilling down into any abnormal or suspicious endpoint interaction activities appearing in such graphs using the UI of the network application as would now be apparent to one of ordinary skill in the art in view of the various embodiments disclosed herein.

Figure 13:
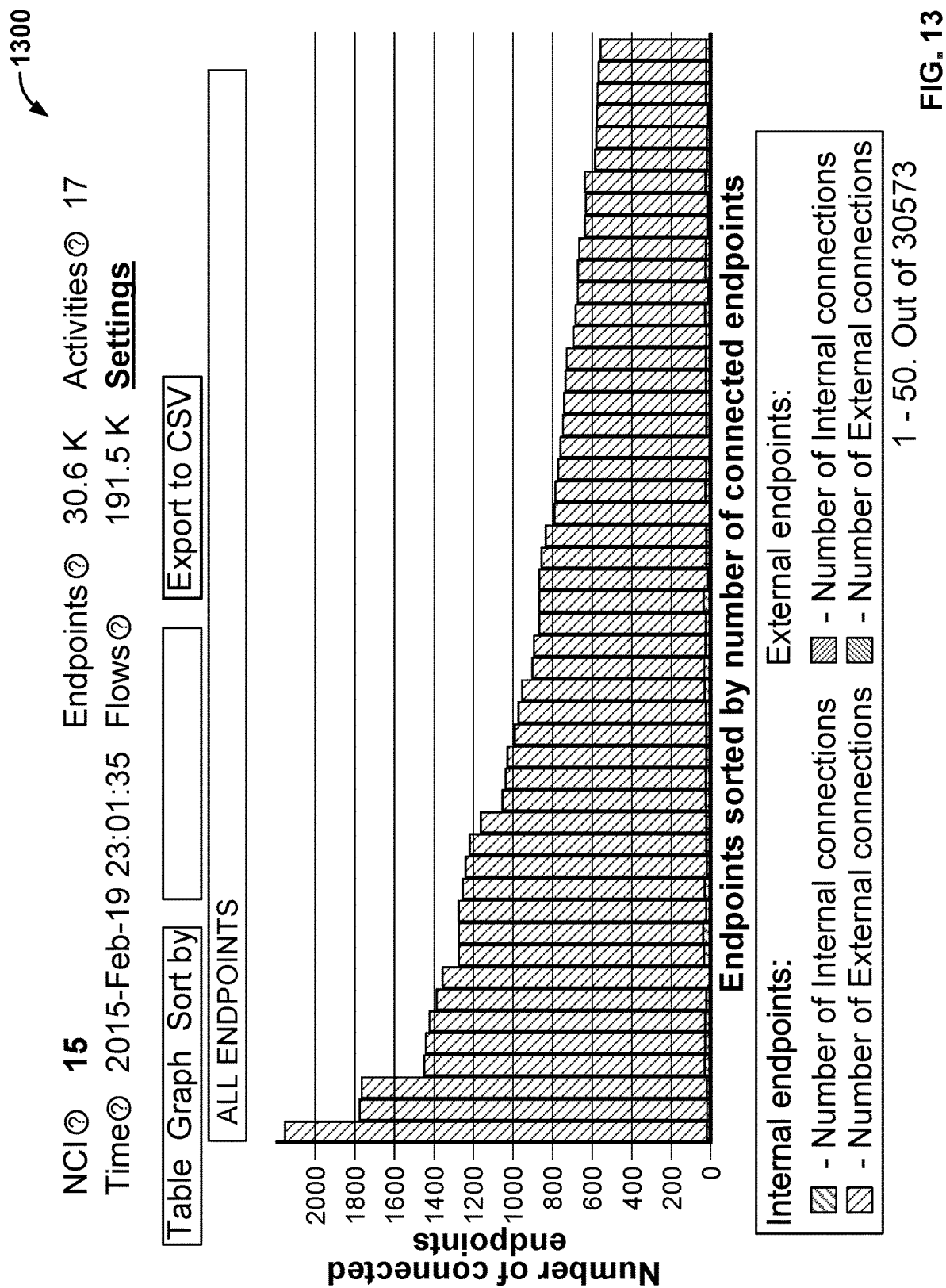
FIG. 13 is a diagram that shows a histogram of endpoints in accordance with some embodiments.

FIG. 13 is a diagram that shows a histogram of endpoints in accordance with some embodiments. Specifically, FIG. 13 shows a histogram 1300 that provides a histogram of endpoints. More specifically, histogram 1300 provides an endpoint view that shows a histogram of endpoints lined up according to the number of interactions (e.g., the endpoints are sorted by a number of connected endpoints as shown). In addition, the bars of the histogram can also indicate internal versus external interactions (e.g., using different colors, grey scale, or other visual/graphical indicators to distinguish between internal interactions and external interactions).

As another example use case of a network application executed on a telemetry platform for anomaly detection for an enterprise network, if endpoints have more internal interactions than external ones, and if this difference is relatively large (e.g., based on a threshold, such as a difference that deviates by more than a given factor of the expected value(s)), then such can be used as an indicator of some anomaly or an endpoint involved in mostly internal activity that is expected, such as a member of a Hadoop cluster. For example, any such endpoints that are identified as having a large number of endpoint interactions, such as endpoints with a large number of connections as shown in FIG. 13 and also shown in FIG. 14 as further described below (e.g., such endpoints can also be indicated as exceeding a threshold and suggested for further examination on this screen or another screen of the UI of the network application, such as a dashboard/report/alert that identifies any such endpoints and allows for further examination of such endpoints and/or their monitored connections), can be further examined by drilling down into any abnormal or suspicious endpoint interaction activities using the UI of the network application as would now be apparent to one of ordinary skill in the art in view of the various embodiments disclosed herein.

Figure 14:
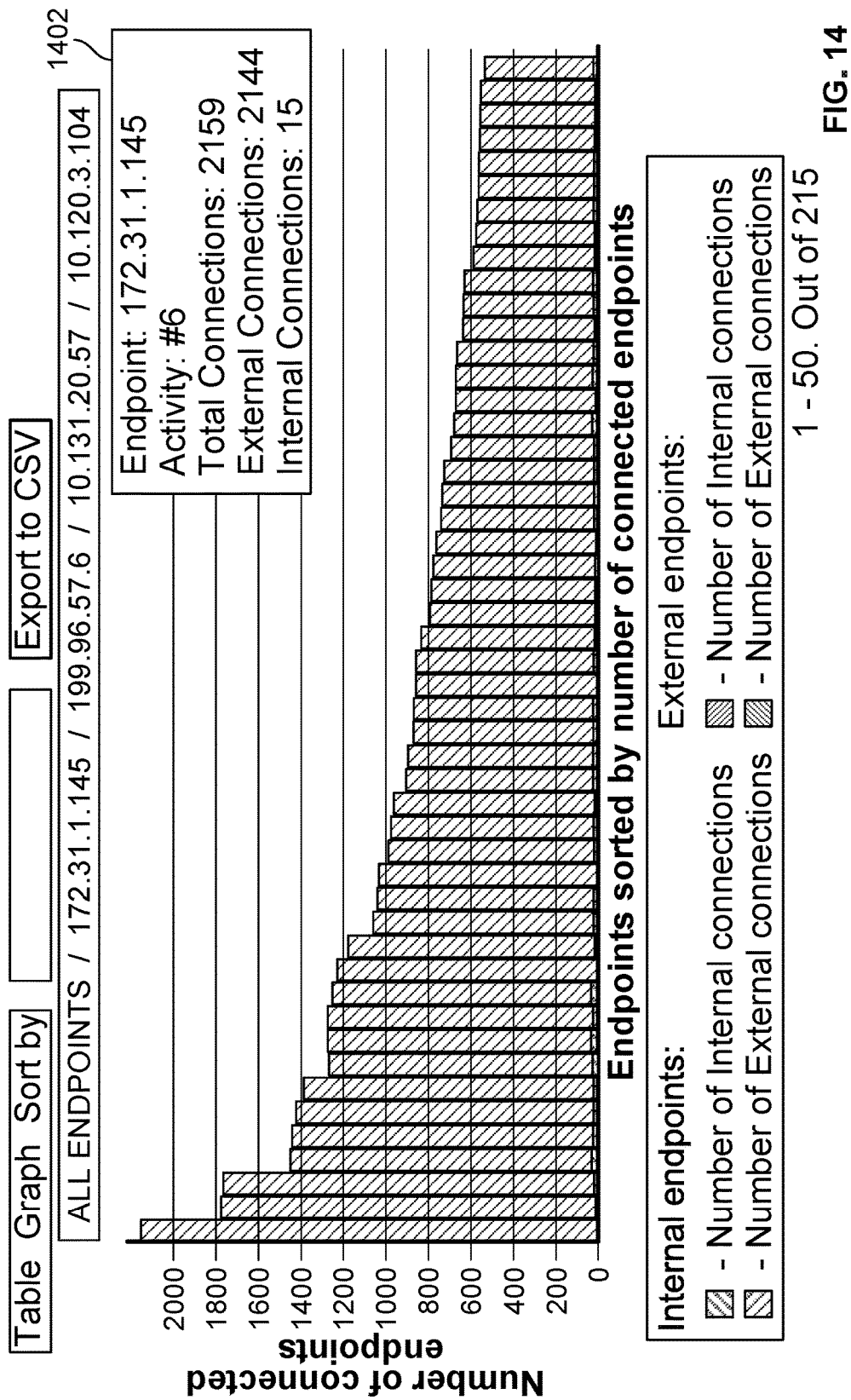
FIG. 14 is another diagram that shows a histogram of endpoints in accordance with some embodiments.

FIG. 14 is another diagram that shows a histogram of endpoints in accordance with some embodiments. Specifically, FIG. 14 shows a histogram 1400 that provides a histogram of endpoints similar to that shown in FIG. 13. More specifically, histogram 1400 provides an endpoint view that shows a histogram of endpoints lined up according to the number of interactions (e.g., the endpoints are sorted by a number of connected endpoints as shown). In addition, the bars of the histogram can also indicate internal versus external interactions (e.g., using different colors, grey scale, or other visual/graphical indicators to distinguish between internal interactions and external interactions).

As another example use case of a network application executed on a telemetry platform for security for an enterprise network, all endpoints that were accessed by a suspicious endpoint, and in turn accessed by other endpoints can be identified. For example, the network application (e.g., NCI/Tapestry or another network application) can provide easy ways to traverse the graph of FIG. 14 starting from any endpoint (e.g., in this example, the first bar is indicated as the endpoint of interest that is selected). In an example implementation, selecting a bar (e.g., endpoint of interest) by hovering a cursor over the bar on the histogram shows details of the endpoint represented by the bar as shown at 1402 of FIG. 14. In an example implementation, clicking on the bar can provide the histogram of endpoints that interacted with the endpoint. By clicking on successive bars of interest, a user (e.g., IT/network admin) can traverse the graph following one endpoint connected to another, and so on. The set of (e.g., breadcrumbs) endpoints encountered while traversing the graph can be seen just above the histogram as shown in FIG. 14. As such, this set of endpoints can be identified as possibly suspicious/contaminated and/or having been accessed by a suspicious endpoint. For example, an IT/network/security admin can use that identified set of endpoints to focus any remediation efforts, such as to quarantine and or perform a security audit/scan of each of that computing devices included in the identified set of endpoints.

In one embodiment, a system/process/computer program product for monitoring and analysis of interactions between network endpoints includes comparing interactions of two or more endpoints to identify similarities. For example, this feature can be used to facilitate identification of malware-controlled systems, such as described herein.

In one embodiment, a system/process/computer program product for monitoring and analysis of interactions between network endpoints includes performing multiple analytics based on different criteria concurrently. For example, this feature can be used to help to identify and narrow down the scope of search for endpoints of interest such as malware-infected endpoints, such as described herein. As an example use case scenario, community detection can be performed on internal endpoints as similarly described above, and if an abnormality is identified using a statistical analysis of the endpoint interactions and/or based on an inspection of the graph visualization of the monitored endpoint interactions, then a different temporal analysis can be performed on the suspected endpoint or the related endpoints, such as using the various embodiments described herein.

In one embodiment, a system/process/computer program product for monitoring and analysis of interactions between network endpoints includes support for an ability to track community participation and fan-out of endpoints over time. For example, each endpoint's interaction history can be part of its profile and can be maintained in the graph visualization of network endpoint interactions. As such, an anomaly can be indicated when an endpoint exhibits behavior that is different from its profile, such as described herein.

Using DNS as an Indicator of Endpoint Interactions

Figure 15:
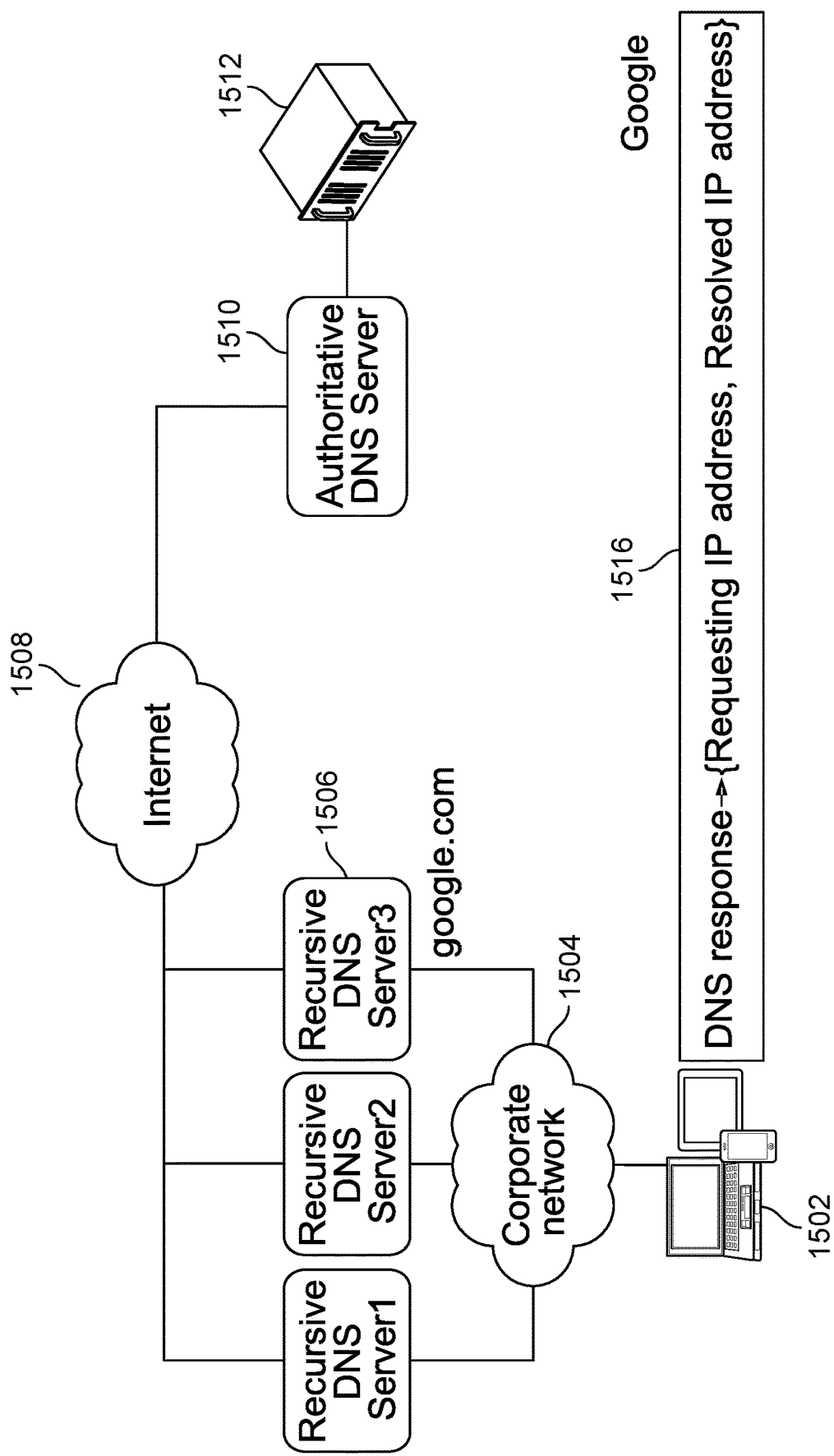
FIG. 15 is a diagram that illustrates the use of DNS for a typical enterprise network.

FIG. 15 is a diagram that illustrates the use of DNS for a typical enterprise network. In most networks (e.g., enterprise/corporate and/or other networks), DNS responses are generally indicative of a significant portion of interactions between endpoints, such as sessions or other connections that indicate interactions between endpoints.

Referring to FIG. 15, a user at a client device 1502 (e.g., a laptop, smart phone, tablet, or other computing device) can attempt to access another endpoint, such as an internal endpoint or an external endpoint (e.g., a web site/server, another client computing device, and/or another type of endpoint accessible via web/IP-based network communications), such as via a web browser or other locally executed application. In this example, assume that the user attempts to access an external endpoint, such as www.Google.com provided via a remote web server shown at 1512. The user can type in the Uniform Resource Locator (URL) (e.g., also referred to as a uniform resource indicator (URI)) for Google, such as www.google.com, into the web browser to attempt to access the Google web site. The browser sends a DNS request for that submitted URL in order to determine the IP address associated with that URL. The DNS request for the google.com URL is communicated via corporate network 1504 to a recursive DNS server 1506. Assuming that recursive DNS server 1506 does not have the IP address for google.com locally cached, then the DNS request for the google.com URL is communicated via the Internet 1508 to an authoritative DNS server 1510, which returns the requested IP address. The DNS response is received at client device 1502. The DNS response includes a requesting IP address and the resolved IP address as shown at 1516.

Figure 16:
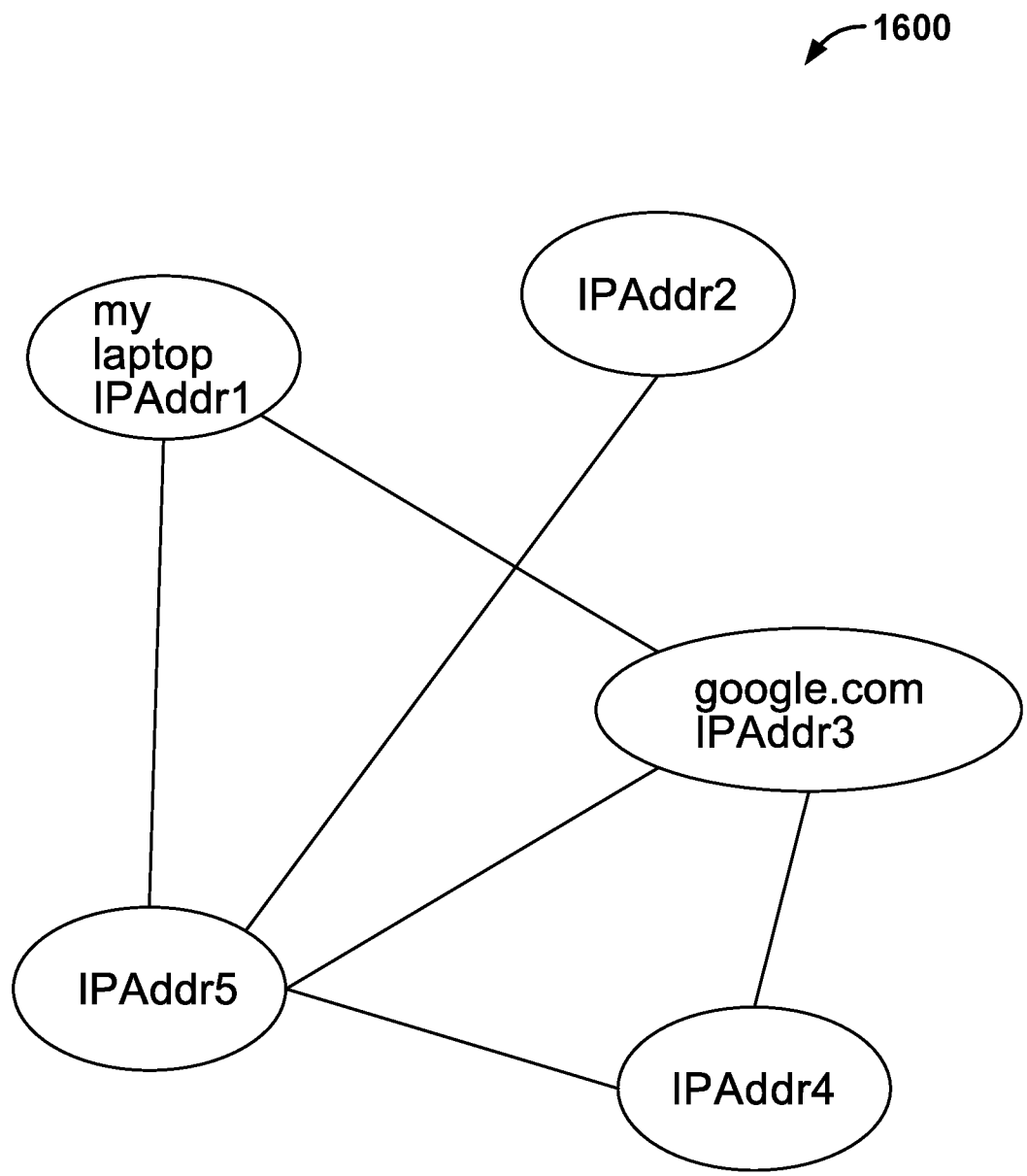
FIG. 16 is another diagram that shows a graph of endpoint interactions in accordance with some embodiments.

FIG. 16 is another diagram that shows a graph of endpoint interactions in accordance with some embodiments. Specifically, FIG. 16 shows a graph 1600 of a set of endpoints, shown as circles, and their interactions with other endpoints, shown as edges. More specifically, each of the endpoints corresponds to a unique IP address and is identified with at least their respective unique IP address and, in some cases, additional label information is provided, such as other name/site information for the endpoint (e.g., my laptop, google.com, etc.). For example, the network application can include a user interface that allows a user to label a given endpoint and/or such information can be imported from an IP address management system that includes such label information associated with internal and/or external IP addresses. For external endpoints, such as google.com, such FQDN information can be obtained from the DNS request/response data that can be collected by the network application/telemetry platform.

In one embodiment, metadata (e.g., additional/external metadata) can be added to internal and/or external endpoints (e.g., such metadata can be different for different endpoints) to improve analytics of endpoint interactions, such as described herein. For example, MAC addresses, host names, and/or FQDN provided from external sources can be added to graph vertex labels for storing in the graph of endpoint interactions, such as shown in FIG. 16 and also shown in FIG. 18. As a result, certain endpoints can be selectively tracked differently from others based on such metadata. In some cases, these endpoints may be serving important functions in the network or may be suspicious endpoints (e.g., IT/network admin expert/other input can identify critical endpoints in an enterprise network, such as a payroll server, a source code repository, or other expert metadata/tags associated with particular endpoints in the graph can facilitate greater insights into monitored network endpoint interactions for various purposes), such as further described herein.

In one embodiment, adaptive expertise learning capabilities can capture and enhance endpoint and interaction information. For example, IT/network admin personnel generally have deep knowledge of their network deployment, often undocumented or in a form not available to be input into endpoint metadata. The disclosed techniques can capture information directly from such users, in some cases, by prompting power users to fill-in information about some auto-detectable graph structure. In some cases, identifying an endpoint(s) with high in-degree or high out-degree can be of interest (e.g., users can even leave questions for others to answer about an endpoint or interaction set).

Collecting DNS Responses for Monitoring Endpoint Interactions

Figure 17:
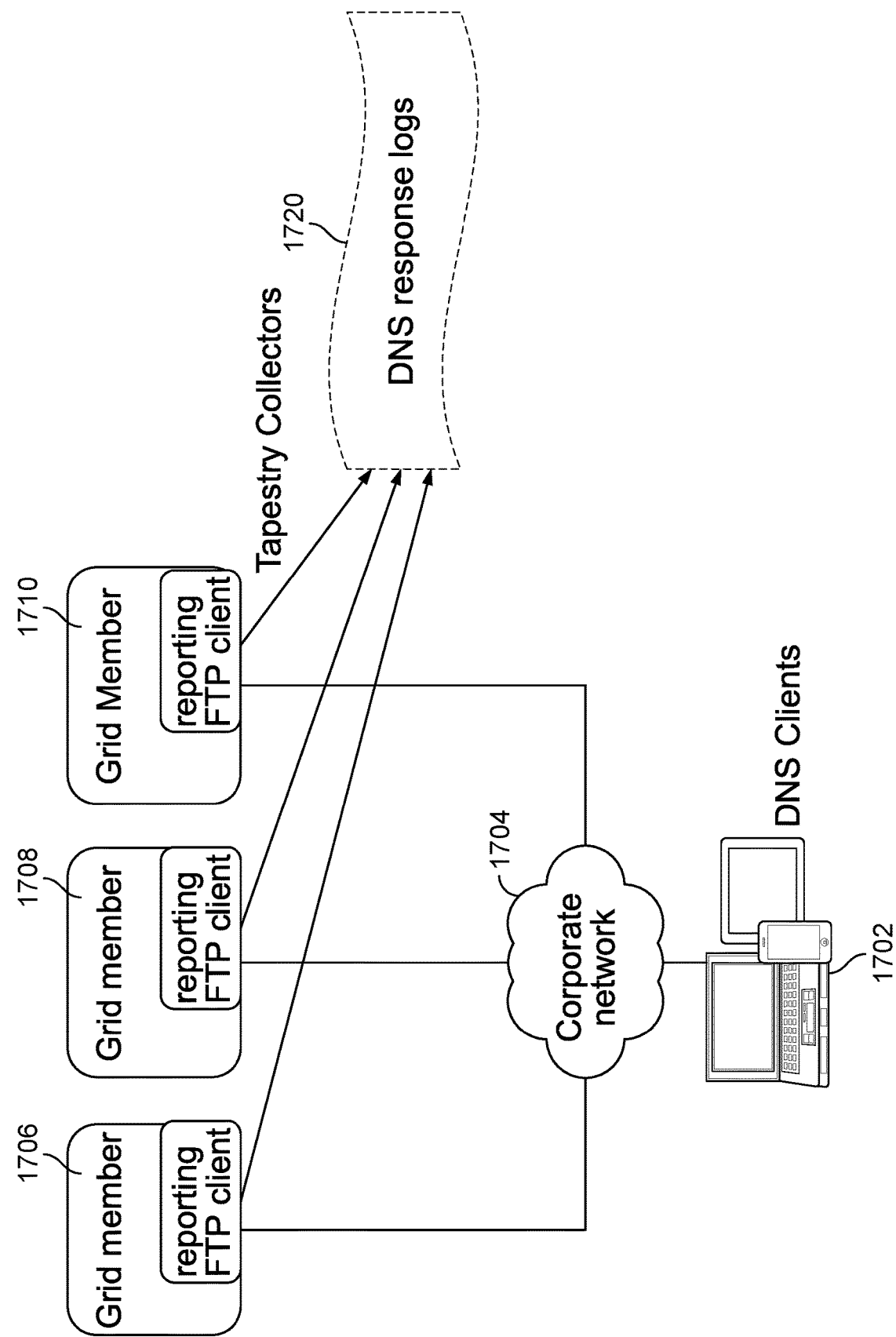
FIG. 17 is a functional diagram that illustrates the collection of DNS response logs from DNS devices in accordance with some embodiments.

FIG. 17 is a functional diagram that illustrates the collection of DNS response logs from DNS devices in accordance with some embodiments. In one embodiment, the collection of DNS response logs from DNS devices (e.g., DNS appliances/servers) can be implemented for an integrated platform for telemetry and analytics as shown in FIG. 17 and as similarly described above with respect to FIG. 11.

Referring to FIG. 17, a user at a client device 1702 (e.g., a laptop, smart phone, tablet, or other computing device) can attempt to access another endpoint, such as an internal endpoint or an external endpoint (e.g., a web site/server, another client computing device, and/or another type of endpoint accessible via web/IP-based network communications), such as via a web browser or other locally executed application. As similarly described above in FIG. 15, an initial set-up of such a connection/session from the client device with another endpoint typically involves sending a DNS request from the client device to a local DNS server. As shown in FIG. 17, a corporate network 1704 includes DNS servers 1706, 1708, and 1710 (e.g., which can be commercially available DNS appliances/grid members, such as available from Infoblox Inc. or another vendor). As also shown, each of the DNS servers includes a reporting FTP client (e.g., a reporting client that can communicate using the FTP protocol to send the DNS response log data to an FTP server) that can send DNS response logs shown as 1720 to an FTP server (e.g., the FTP server of the integrated platform for telemetry and analytics as shown in FIG. 11).

Figure 18:
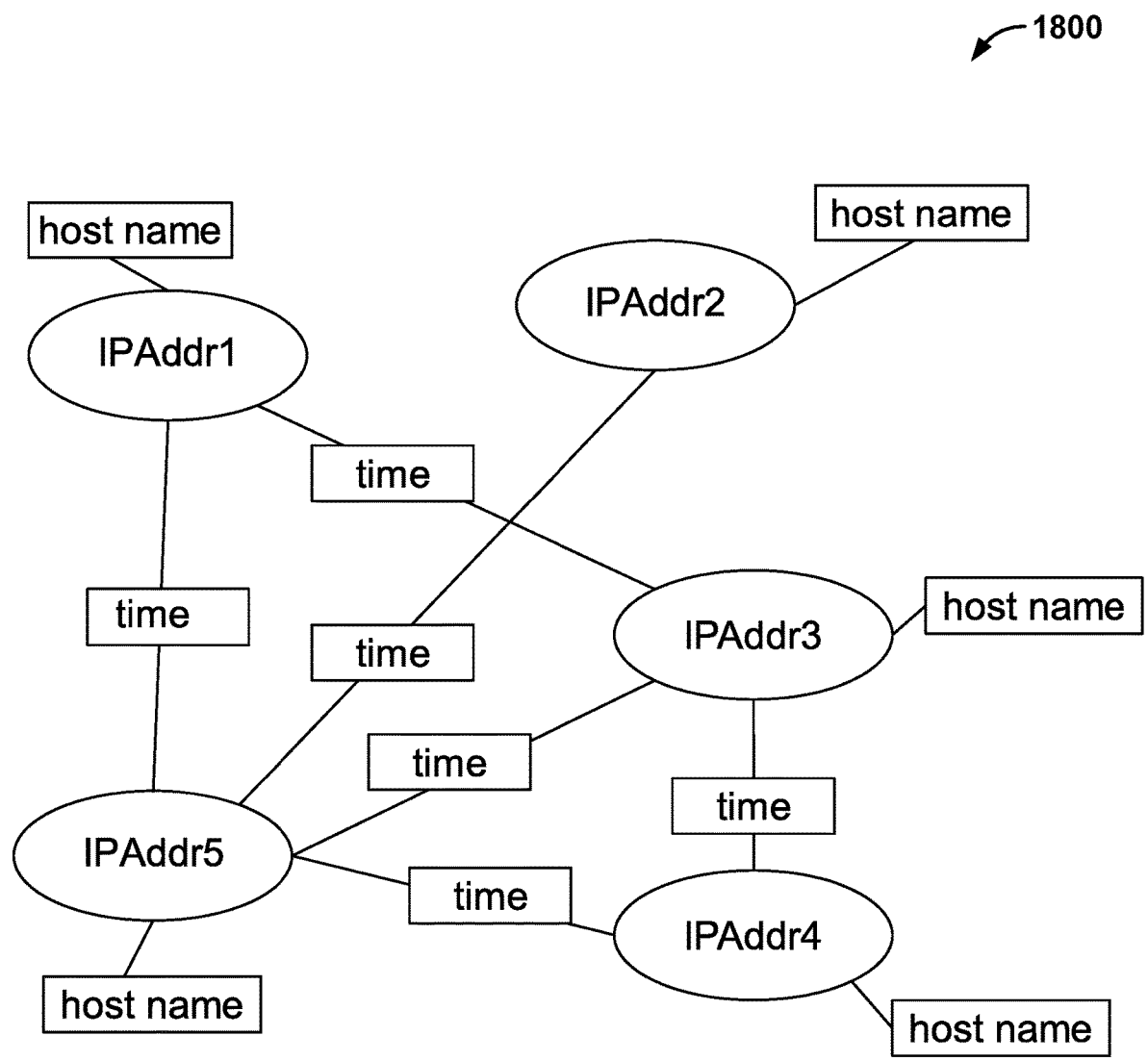
FIG. 18 is a diagram that shows a directed graph of endpoint interactions in accordance with some embodiments.

FIG. 18 is a diagram that shows a directed graph of endpoint interactions in accordance with some embodiments. Specifically, FIG. 18 shows a directed graph 1800 of a set of endpoints, shown as circles, and their endpoint interactions, shown as edges, which can be stored in a data store, such as similarly described above with respect to FIGS. 11 and 12. More specifically, each of the endpoints corresponds to a unique IP address as shown and is identified with at least their unique IP address and additional label information including host name as shown. As also shown, a timestamp (e.g., and in some implementations, a count of the number of such interactions/connections) can be associated with each of the edges to provide labels that indicate a most recent time that the respective endpoint interaction was monitored based on the collected DNS response data associated with the respective endpoint interaction (e.g., and the graph is a directed graph as the edges can be directed to indicate which endpoint initiated the interaction/connection between the two endpoints). In some cases, additional label information can be collected or configured (e.g., manually added by a user, such as an IT/network admin and/or imported from another data source, such as an IP address management system, and/or using other DNS/network collected data that can be associated with such IP addresses and/or endpoint interactions). In an example implementation, the directed graph can be implemented using Digraph, which is available in the standard Erlang programming language, supports labels on vertices and edges, and provides digraph utilities.

FIG. 19 provides example filtering settings for processing the collected DNS responses in accordance with some embodiments. In one embodiment, these filtering settings can be performed by the filtering and analytics component of the integrated platform for telemetry and analytics as shown in FIG. 11 and FIG. 12. In particular, FIG. 19 provides example default settings and settings in deployment for filtering the collected DNS responses.

Figure 20:
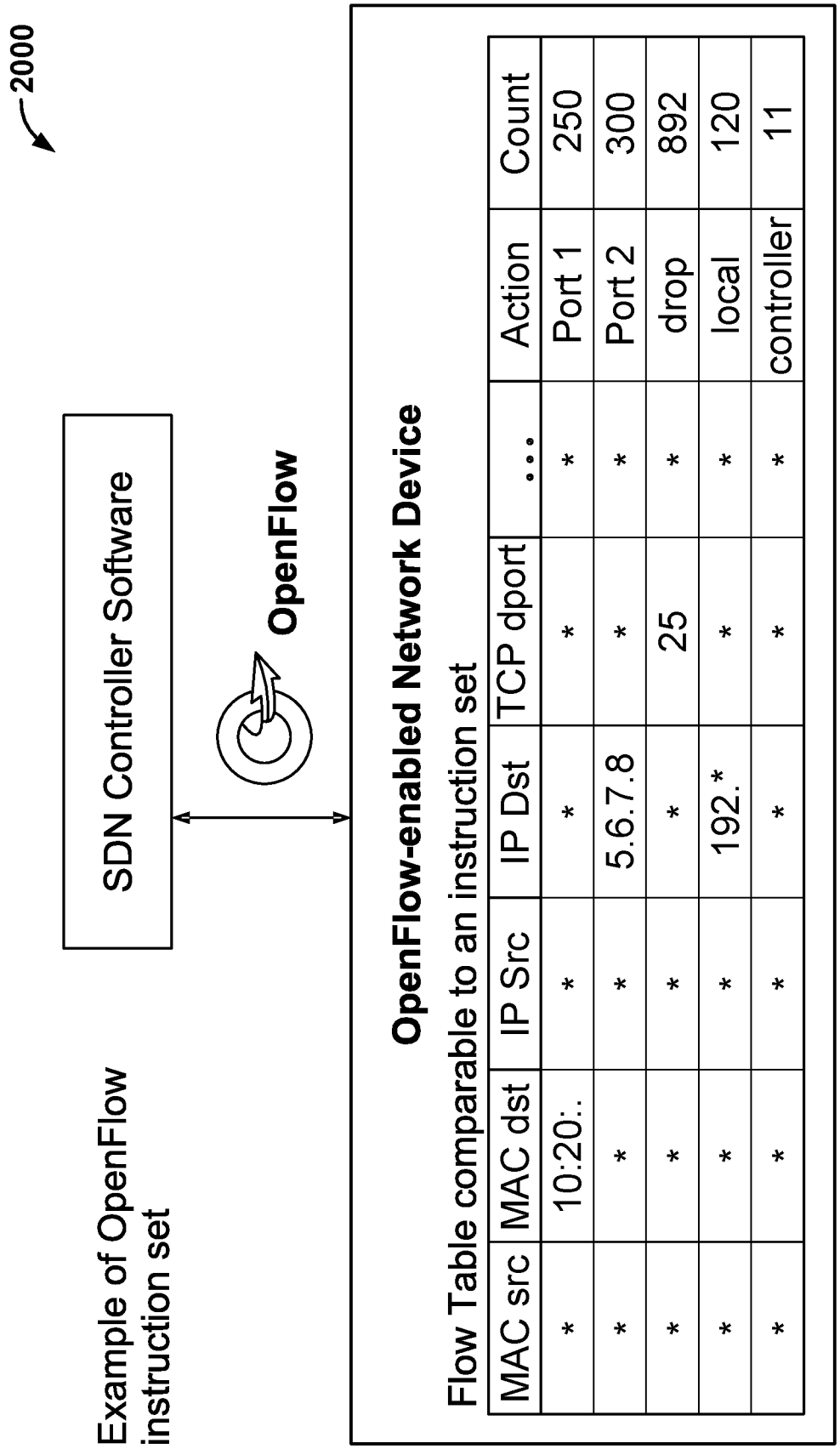
FIG. 20 is a diagram that illustrates an example of an OpenFlow instruction set for an OpenFlow-enabled network device.

FIG. 20 is a diagram that illustrates an example of an OpenFlow instruction set for an OpenFlow-enabled network device. In particular, a flow table 2000 provides configuration settings for an OpenFlow-enabled network device (e.g., an OpenFlow switch) that is comparable to an instruction set for the OpenFlow-enabled network device.

Figure 21:
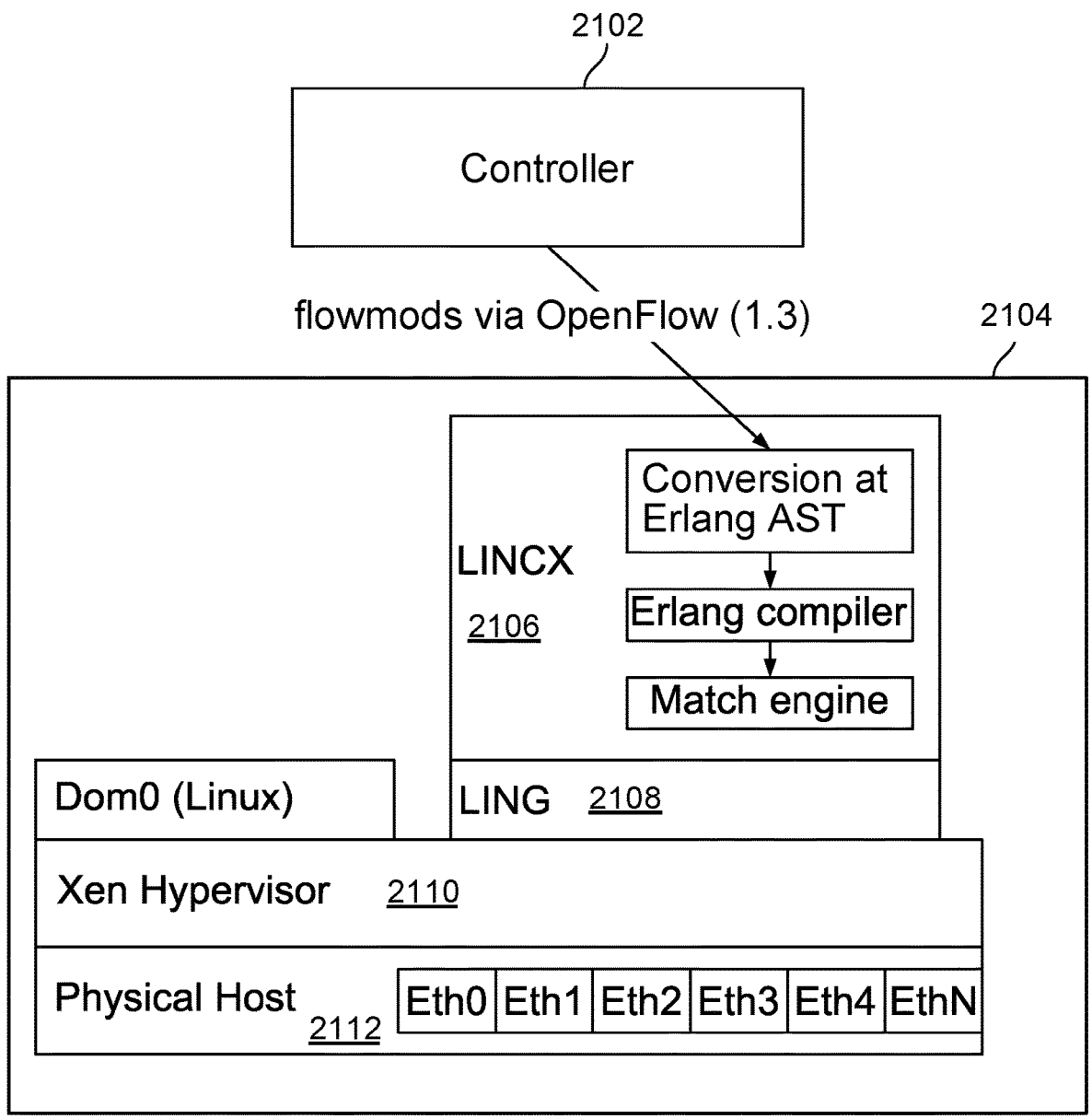
FIG. 21 is a diagram that illustrates an example architecture of an OpenFlow network device in accordance with some embodiments.

FIG. 21 is a diagram that illustrates an example architecture of an OpenFlow network device in accordance with some embodiments. In particular, the OpenFlow-enabled network device of FIG. 21 is an example of an OpenFlow network device that implements a fast CPU-based Ethernet switch. As shown, a controller 2102 (e.g., control plane with DPI 1262 of FIG. 12) is in network communication with an OpenFlow network device 2104 (e.g., flowmods via OpenFlow version 1.3 as shown in this example). As also shown, OpenFlow network device 2104 includes a LINCX switch 2106. For example, LINCX switch 2106 can be implemented as a pure OpenFlow software switch using the Erlang programming language. LINCX switch 2106 can be executed within a separate domain under a Xen hypervisor 2110 using LING 2108 (e.g., available via an open source project at erlangonxen.org). Xen hypervisor 2110 is executed on a physical host 2112 (e.g., server/appliance). Various other configurations and implementations of an OpenFlow switch that exist can be provided and, for example, various OpenFlow switches are available from open source projects and are also commercially available as would be apparent to one of ordinary skill in the art.

Figure 22:
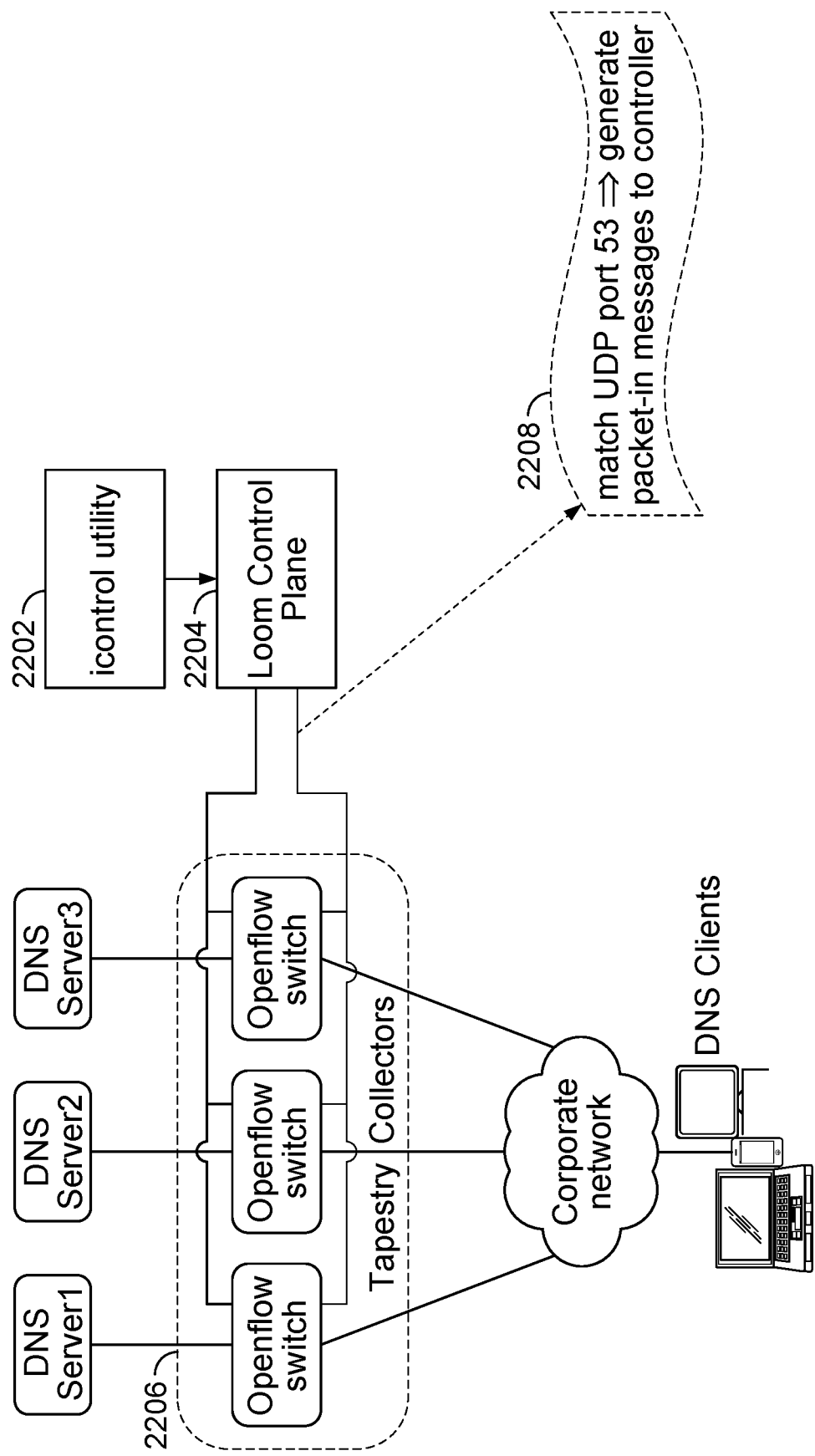
FIG. 22 is a diagram that illustrates an example architecture of an OpenFlow network device and a controller for identifying and collecting DNS responses in accordance with some embodiments.

FIG. 22 is a diagram that illustrates an example architecture of an OpenFlow network device and a controller for identifying and collecting DNS responses in accordance with some embodiments. A control utility 2202 (e.g., a tool that provides a user interface (UI) for a user (IT/network admin) for configuring OpenFlow switches via a controller) is in communication with a control plane 2204 (e.g., a controller (Loom control plane) for controlling OpenFlow switches, such as similarly described above with respect to control plane with DPI 1262 of FIG. 12). Control plane 2204 is in network communication with various collectors shown as OpenFlow switches 2206. As similarly described above, the OpenFlow switches can be configured using control plane 2204. Various setup flow rules can be provided from controller 2102 to OpenFlow network device 2104 of FIG. 21. For example, setup flow rules can include forwarding rules, such as bridge(port 1, port 2) and visibility rules, such as dns_tap(port1, port2, controller, UDP, port 53). In this example implementation, the OpenFlow switches can be configured to identify and collect DNS responses, such as match UDP port 53 to generate packet-in messages to the controller 2204 as shown at 2208 (e.g., and/or the OpenFlow switches can be configured to tap various other network data).

In an example implementation, the controller (e.g., control plane 2204 and/or control plane with DPI 1262 of FIG. 12) is implemented using the Erlang programming language and can perform deep packet inspection (DPI) for DNS positive responses. Below is an example code segment that illustrates Erlang's pattern matching syntax and networking libraries. In particular, the DNS request/response parsing function is available in Erlang kernel, which can be implemented to identify DNS responses that have valid A records in them as shown in the below example code segment.

```
Result = case (Type1 == ipv4) and (Type2 == udp) of
    true ->
        inet_dns:decode(Payload);
    _ -> unknown
end,
case Result of
    {ok, DnsRec} ->
        Match = match_reply(DnsRec),
............
match_reply({dns_rec, {dns_header, _, true, _, _, _, _, _, _, _},
    [{dns_query, Query, a, in}], RRSet, _, _}) ->
    Record = lists:keyfind(a, 3, RRSet),
    case Record of
        false ->
            {error, no_a_record};
        {dns_rr, _, a, _, _, _, ID, _, _, _} ->
            {ok, ID, Query}
    end;
match_reply(_) ->
    {error, bad_response}.
```

Figure 23:
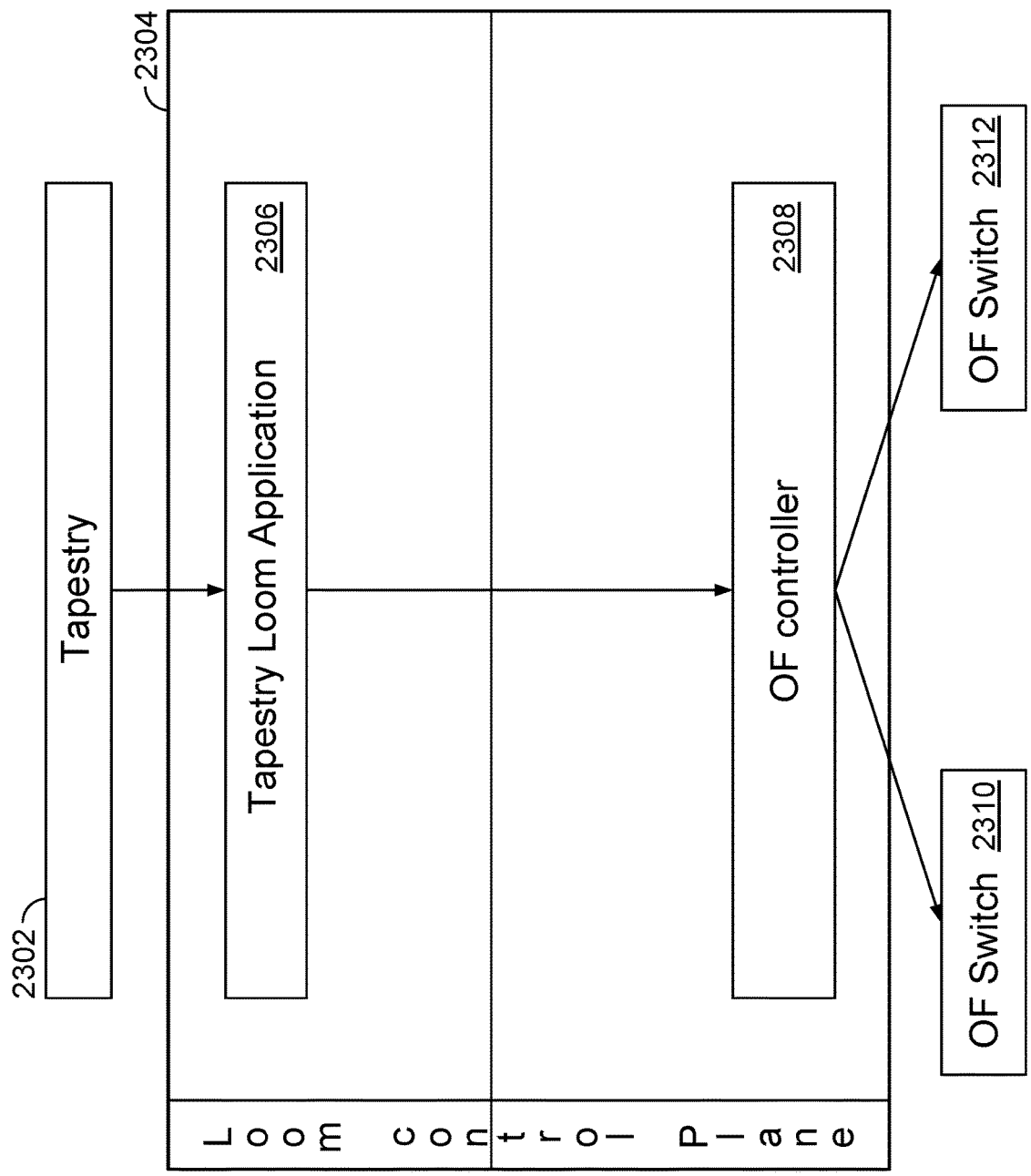
FIG. 23 is a diagram that illustrates an architecture of a controller of a system for monitoring and analysis of interactions between network endpoints in an enterprise network that includes OpenFlow network devices in accordance with some embodiments.

FIG. 23 is a diagram that illustrates an architecture of a controller of a system for monitoring and analysis of interactions between network endpoints in an enterprise network that includes OpenFlow network devices in accordance with some embodiments. As shown, a network application 2302 (e.g., such as NCI/Tapestry application or another network application) is in communication with a controller 2304 of a system for monitoring and analysis of interactions between network endpoints in an enterprise network that includes OpenFlow network devices. Controller 2304 (e.g., Loom control plane) includes a Tapestry Loom application 2306 and an OpenFlow controller 2308 in communication with OpenFlow switches 2310 and 2312.

Figure 24:
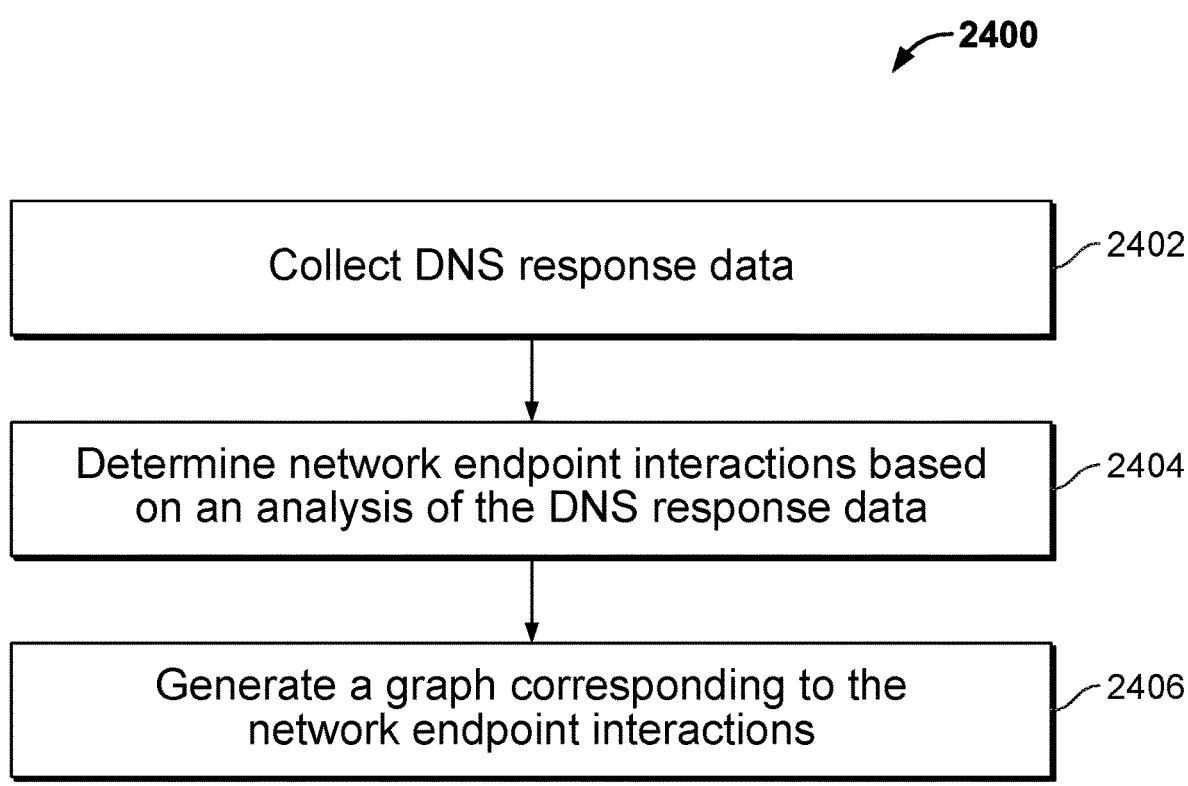
FIG. 24 is a flow diagram of a process for monitoring and analysis of interactions between network endpoints in a network in accordance with some embodiments.

FIG. 24 is a flow diagram of a process for monitoring and analysis of interactions between network endpoints in a network in accordance with some embodiments. In some embodiments, the process 2400 is performed by a network application (e.g., executed on/using a tapestry platform), such as described above with respect to FIGS. 1-3, 11 and/or 12. In one embodiment, a network application for monitoring and analyzing interactions between endpoints collects data related to endpoint interactions from network-wide control systems for an enterprise network, such as DNS devices (e.g., DNS appliances/servers). The network application analyzes endpoint interaction data (e.g., (near) real-time endpoint interaction data) to identify and record higher-level relationships between endpoints. The network application generates a graphical representation of the endpoint interactions, such as further discussed below.

At 2402, DNS response data is collected. For example, the DNS data can be collected from network devices, which can include physical network devices (e.g., DNS servers/appliances), virtual network devices, and/or software-defined networking (SDN) devices (e.g., OpenFlow switches). For example, the collected DNS response data can include a tuple of the IP address of the requesting endpoint, the IP address of the destination endpoint, and the fully qualified domain name (FQDN) of the destination endpoint. In some cases, other information can also be collected with such DNS responses, such as timestamp data and/or other data as further described below.

At 2404, network endpoint interactions are determined based on an analysis of the DNS response data. For example, the network application/telemetry platform can perform a near real-time analysis of endpoint interactions using various techniques, such as described above.

At 2406, a graph corresponding to the network endpoint interactions is generated based on the analysis of the DNS response data. In one embodiment, the network application (e.g., Tapestry or another application/tool or a platform on which such applications can execute, such as similarly described herein) includes a graphical user interface (GUI) to represent the monitored and analyzed endpoint interactions. For example, the GUI of the network application can provide new insights to a network operator/admin by combining individual endpoint information together with a classification(s) of endpoints into groups or communities based on the nature of interactivity between endpoints. As such, the network application/platform is a tool for a network operator/admin that provides new and improved techniques to identify complexity of interacting business processes and the underlying network that supports such processes. For instance, observing endpoint interaction behavior of related endpoints rather than just an endpoint's behavior alone can provide users (e.g., a network operator/admin) with a quick broad view of related activities in the network, which can be applied to facilitate network capacity planning and/or security for the network, such as described above with respect to various use case scenarios.

Figure 25:
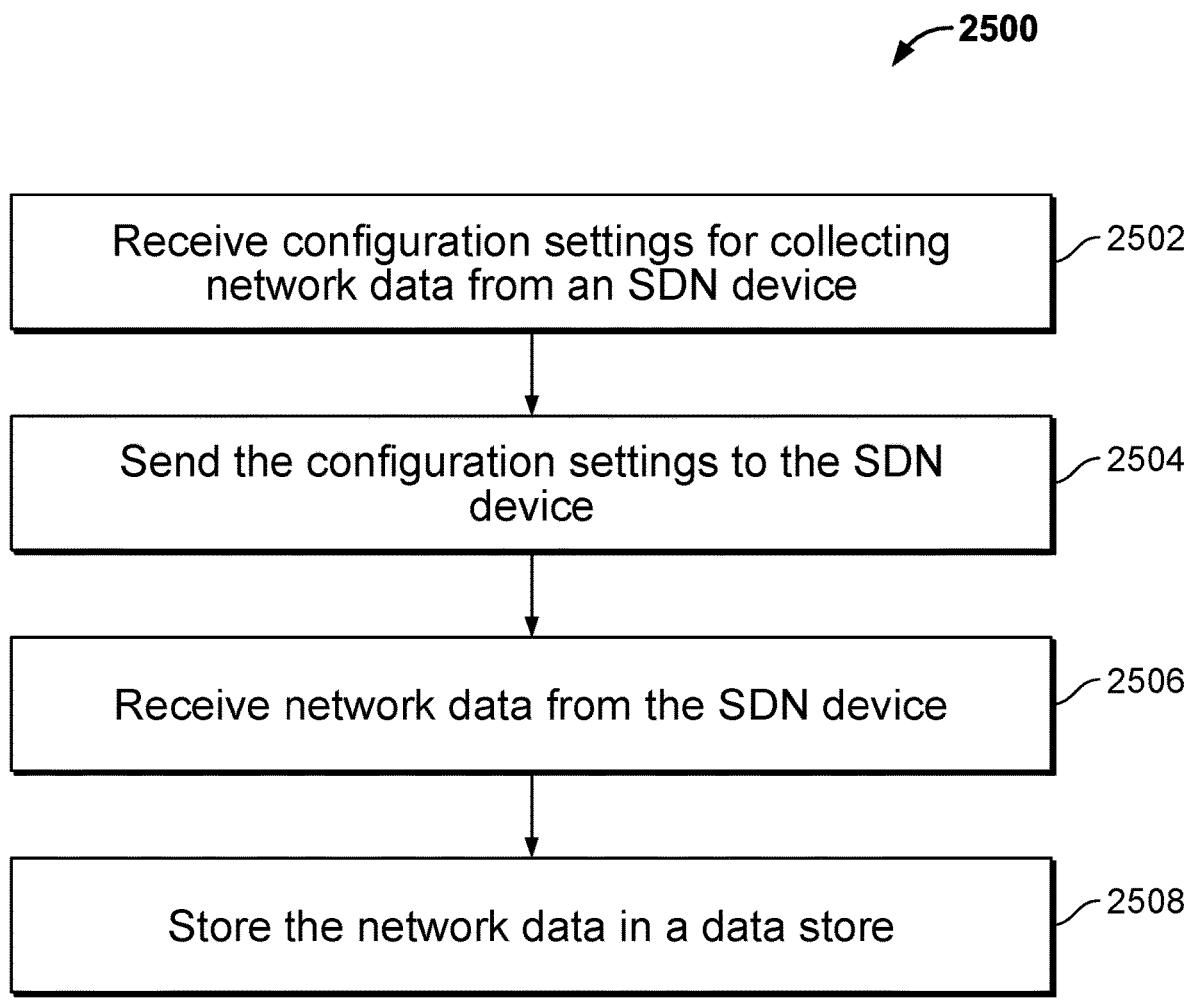
FIG. 25 is another flow diagram of a process for monitoring and analysis of interactions between network endpoints in a network in accordance with some embodiments.

FIG. 25 is another flow diagram of a process for monitoring and analysis of interactions between network endpoints in a network in accordance with some embodiments. In some embodiments, the process 2500 is performed by a controller and data store of a tapestry platform, such as described above with respect to FIG. 12.

At 2502, configuration settings for collecting network data from an SDN device (e.g., an OpenFlow switch or other type of SDN device) are received. For example, an application/utility can be used by a user (e.g., IT/network admin) to send configuration settings and/or be programmed to automatically send configuration settings for collecting network data (e.g., DNS responses and/or other network data) from SDN device(s) on an enterprise network.

At 2504, the configuration settings for collecting network data from the SDN device are sent to the SDN device. For example, the configuration settings can be sent from a controller (e.g., an SDN/OpenFlow controller) of a telemetry platform, such as similarly described above.

At 2506, network data is received from the SDN device. For example, the network data (e.g., DNS responses and/or other network data) can be received from SDN device(s) on the enterprise network at the controller (e.g., SDN/OpenFlow controller) of the telemetry platform, such as similarly described above.

At 2508, the network data is stored in a data store. For example, the network data can be stored using a graph database of the telemetry platform, such as described above. The stored network data can then be analyzed to perform various applications for monitoring and analysis of interactions between network endpoints in the enterprise network, such as similarly described above with respect to various embodiments.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for monitoring and analysis of interactions between network endpoints, comprising:
 a processor configured to:
  collect Domain Name System (DNS) response data from a network device, comprising to:
   identify DNS responses from the network device that match User Datagram Protocol (UDP) port 53;
  determine network endpoint interactions based on an analysis of the DNS response data, comprising to:
   identify and group the network endpoint interactions to obtain various groups of activities based on the following:
    initialize a first node in a set of nodes with a first label, each node of the set of node having a unique label;
    identify a maximum number of neighbors of the first node having a same label, the same label corresponding to a second node, the second node being different from the first node;
    change the first label to a second label; and
    group a second node with the first node to obtain a first group, the second node having the same label as the first node;
  determine whether anomalous network activity has occurred based on a comparison of a first number of groups of network endpoint interactions for a first period of time and a second number of groups of network endpoint interactions for a second period of time, the first period of time being different from the second period of time, wherein to determine whether the anomalous network activity has occurred comprises to:
   compare the first number of groups and the second number of groups to obtain a difference; and
   in response to a determination that the difference satisfies a threshold, determine that the anomalous network activity has occurred;
  in response to determination that the anomalous network activity has occurred, perform a remedial action on an enterprise network; and
  generate a graph corresponding to the network endpoint interactions; and
 a memory coupled to the processor and configured to provide the processor with instructions.

2. The system of claim 1, wherein the network device includes a DNS device.

3. The system of claim 1, wherein the network device includes a software-defined networking (SDN) device.

4. The system of claim 1, wherein the network device includes a DNS device and/or a software-defined networking (SDN) device.

5. The system of claim 1, wherein the network device includes a software-defined networking (SDN) switch.

6. The system of claim 1, wherein the network device includes an OpenFlow switch.

7. The system of claim 1, wherein the processor is further configured to:
 store the DNS response data in a data store.

8. The system of claim 1, wherein the processor is further configured to:
 execute a telemetry platform, wherein the telemetry platform includes a controller for collecting the DNS response data from the network device.

9. The system of claim 1, wherein the processor is further configured to:
 configure a software-defined networking (SDN) device to send the DNS response data to a controller of a telemetry platform.

10. The system of claim 1, wherein the processor is further configured to:
generate a report based on an analysis of the network endpoint interactions for a plurality of network endpoints internal to the enterprise network.

11. A method for monitoring and analysis of interactions between network endpoints, comprising:
collecting Domain Name System (DNS) response data from a network device, comprising:
identifying DNS responses from the network device that match User Datagram Protocol (UDP) port 53;
determining network endpoint interactions based on an analysis of the DNS response data, comprising:
identifying and grouping the network endpoint interactions to obtain various groups of activities based on the following:
initializing a first node in a set of nodes with a first label, each node of the set of node having a unique label;
identifying a maximum number of neighbors of the first node having a same label, the same label corresponding to a second node, the second node being different from the first node;
changing the first label to a second label; and
grouping a second node with the first node to obtain a first group, the second node having the same label as the first node;
determining whether anomalous network activity has occurred based on a comparison of a first number of groups of network endpoint interactions for a first period of time and a second number of groups of network endpoint interactions for a second period of time, the first period of time being different from the second period of time, wherein the determining of whether the anomalous network activity has occurred comprises:
comparing the first number of groups and the second number of groups to obtain a difference; and
in response to a determination that the difference satisfies a threshold, determining that the anomalous network activity has occurred;
in response to determination that the anomalous network activity has occurred, performing a remedial action on an enterprise network; and
generating a graph corresponding to the network endpoint interactions.

12. The method of claim 11, wherein the network device includes a DNS device and/or a software-defined networking (SDN) device.

13. The method of claim 11, further comprising:
storing the DNS response data in a data store.

14. The method of claim 11, further comprising:
executing a telemetry platform, wherein the telemetry platform includes a controller for collecting the DNS response data from the network device.

15. The method of claim 11, further comprising:
configuring a software-defined networking (SDN) device to send the DNS response data to a controller of a telemetry platform.

16. A computer program product for monitoring and analysis of interactions between network endpoints, the computer program product being embodied in a tangible computer readable storage medium and comprising computer instructions for:
collecting Domain Name System (DNS) response data from a network device, comprising:
identifying DNS responses from the network device that match User Datagram Protocol (UDP) port 53;
determining network endpoint interactions based on an analysis of the DNS response data, comprising:
identifying and grouping the network endpoint interactions to obtain various groups of activities based on the following:
initializing a first node in a set of nodes with a first label, each node of the set of node having a unique label;
identifying a maximum number of neighbors of the first node having a same label, the same label corresponding to a second node, the second node being different from the first node;
changing the first label to a second label; and
grouping a second node with the first node to obtain a first group, the second node having the same label as the first node;
determining whether anomalous network activity has occurred based on a comparison of a first number of groups of network endpoint interactions for a first period of time and a second number of groups of network endpoint interactions for a second period of time, the first period of time being different from the second period of time, wherein the determining of whether the anomalous network activity has occurred comprises:
comparing the first number of groups and the second number of groups to obtain a difference; and
in response to a determination that the difference satisfies a threshold, determining that the anomalous network activity has occurred;
in response to determination that the anomalous network activity has occurred, performing a remedial action on an enterprise network; and
generating a graph corresponding to the network endpoint interactions.

17. The computer program product recited in claim 16, wherein the network device includes a DNS device and/or a software-defined networking (SDN) device.

18. The computer program product recited in claim 16, further comprising computer instructions for:
storing the DNS response data in a data store.

19. The computer program product recited in claim 16, further comprising computer instructions for:
executing a telemetry platform, wherein the telemetry platform includes a controller for collecting the DNS response data from the network device.

20. The computer program product recited in claim 16, further comprising computer instructions for:
configuring a software-defined networking (SDN) device to send the DNS response data to a controller of a telemetry platform.

21. A system for monitoring and analysis of interactions between network endpoints, comprising:
a controller for collecting network data from a plurality of network devices in an enterprise network, wherein the collecting of the network data comprises identifying DNS responses from the plurality of network devices that match User Datagram Protocol (UDP) port 53;
a data store in communication with the controller for storing the network data, comprising:
identifying and grouping the network endpoint interactions to obtain various groups of activities based on the following:

initializing a first node in a set of nodes with a first label, each node of the set of node having a unique label;

identifying a maximum number of neighbors of the first node having a same label, the same label corresponding to a second node, the second node being different from the first node;

changing the first label to a second label; and grouping a second node with the first node to obtain a first group, the second node having the same label as the first node;

an analyzer in communication with the data store for:

performing an analysis of the network data to determine interactions between network endpoints;

determining whether anomalous network activity has occurred based on a comparison of a first number of groups of network endpoint interactions for a first period of time and a second number of groups of network endpoint interactions for a second period of time, the first period of time being different from the second period of time, wherein the determining of whether the anomalous network activity has occurred comprises:

comparing the first number of groups and the second number of groups to obtain a difference; and in response to a determination that the difference satisfies a threshold, determining that the anomalous network activity has occurred;

in response to determination that the anomalous network activity has occurred, performing a remedial action on the enterprise network; and a graphics visualizer in communication with the analyzer for generating a graph based on the interactions between network endpoints.

22. The system of claim 21, wherein the plurality of network devices includes physical network devices, virtual network devices, and/or software-defined networking (SDN) devices.

23. The system of claim 21, further comprising:

a data aggregator in communication with the controller for aggregating the network data.

24. The system of claim 21, further comprising:

a web server in communication with the analyzer for web-based network communications with the system.

* * * * *